United States Patent
Wang et al.

(10) Patent No.: US 12,526,688 B2
(45) Date of Patent: *Jan. 13, 2026

(54) METHOD AND APPARATUS FOR BUFFER STATE REPORT

(71) Applicant: Telefonaktiebolaget LM Ericsson (publ), Stockholm (SE)

(72) Inventors: Min Wang, Luleå (SE); Jan Christoffersson, Luleå (SE); Bikramjit Singh, Raasepori (FI); Majid Gerami, Lund (SE); Stefan Wänstedt, Luleå (SE); Mårten Ericson, Gammelstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 435 days.

This patent is subject to a terminal disclaimer.

(21) Appl. No.: 18/008,912

(22) PCT Filed: Apr. 14, 2021

(86) PCT No.: PCT/EP2021/059623
§ 371 (c)(1),
(2) Date: Dec. 7, 2022

(87) PCT Pub. No.: WO2021/254674
PCT Pub. Date: Dec. 23, 2021

(65) Prior Publication Data
US 2023/0239729 A1    Jul. 27, 2023

(30) Foreign Application Priority Data
Jun. 19, 2020  (WO) ................. PCT/EP2020/067214

(51) Int. Cl.
*H04W 28/02* (2009.01)
*H04W 72/1263* (2023.01)
*H04W 72/21* (2023.01)

(52) U.S. Cl.
CPC .................. *H04W 28/0278* (2013.01); *H04W 72/1263* (2013.01); *H04W 72/21* (2023.01)

(58) Field of Classification Search
None
See application file for complete search history.

(56) References Cited

U.S. PATENT DOCUMENTS 8,902,741 B2   12/2014  Zhu et al.
2005/0185583 A1  8/2005  Hosein
(Continued)

FOREIGN PATENT DOCUMENTS

JP         7527982 B2    8/2024
WO     2016163686 A1   10/2016
(Continued)

OTHER PUBLICATIONS

Aby K Abraham, An Optimized Method of Buffer Status Reporting for Uplink Data in L TE, IEEE 978-1-4799-6085-9/15, pp. 1-4, (Year: 2015).*

(Continued)

*Primary Examiner* — Kouroush Mohebbi
(74) *Attorney, Agent, or Firm* — Sage Patent Group

(57) ABSTRACT

Embodiments of the present disclosure provide methods and apparatus for buffer state report. A method performed at a terminal device may comprise: predicting a buffer size associated with data to be transmitted; and transmitting a buffer state report, BSR, including the predicted buffer size to a network node. A method performed at a network node may comprise: receiving a buffer state report, BSR, including a predicted buffer size associated with data to be received from a terminal device; and transmitting a grant for the data according to the received BSR. The latency of data transmission from the terminal device to the network node may be reduced.

19 Claims, 15 Drawing Sheets

(56) References Cited

U.S. PATENT DOCUMENTS

| | | | |
|---|---|---|---|
| 2013/0044699 A1 | 2/2013 | Eriksson | |
| 2016/0080969 A1 | 3/2016 | Tseng | |
| 2017/0164229 A1* | 6/2017 | Callard | H04L 47/722 |
| 2017/0206125 A1 | 7/2017 | Takeshima et al. | |
| 2018/0241675 A1 | 8/2018 | Roncero Izquirdo et al. | |
| 2018/0242189 A1 | 8/2018 | Wang et al. | |
| 2019/0110224 A1* | 4/2019 | Yasukawa | H04W 72/21 |
| 2019/0357247 A1 | 11/2019 | Keskitalo et al. | |
| 2020/0322095 A1 | 10/2020 | Park et al. | |
| 2022/0295492 A1 | 9/2022 | Shattil | |
| 2023/0217304 A1* | 7/2023 | Singh | H04W 72/1263 370/329 |
| 2023/0239729 A1 | 7/2023 | Wang et al. | |

FOREIGN PATENT DOCUMENTS

| | | | |
|---|---|---|---|
| WO | 2020209565 A1 | 10/2020 | |
| WO | 2021254674 A1 | 12/2021 | |
| WO | 2022029580 A1 | 2/2022 | |

OTHER PUBLICATIONS

International Search Report and Written Opinion of the International Searching Authority for PCT International Application No. PCT/EP2021/059623 dated Jul. 1, 2021.

Futurewei, "Enhancements for low-latency IAB Uplink scheduling," R2-1914768, 3GPP TSG-RAN WG2 meeting #108, Reno, Nevada, USA Nov. 18-22, 2019, 8 pages.

Nokia et al., "Remaining issues of buffer status reporting for IAB," R2-2000848, 3GPP TSG-RAN WG2 Meeting #109-e, Online, Feb. 24-Mar. 6, 2020, 2 pages.

Intel Corporation, "New SID: Study on supporting NR from 52.6GHz to 71 GHz," RP-193259, 3GPP TSG RAN Meeting #86, Sitges, Spain, Dec. 9-12, 2019, 3 pages.

3GPP TS 38.321 V16.0.0, "3rd Generation Partnership Project; Technical Specification Group Radio Access Network; NR; Medium Access Control (MAC) protocol specification (Release 16)," Mar. 2020, 141 pages.

3GPP TS 38.331 V16.0.0, "3rd Generation Partnership Project; Technical Specification Group Radio Access Network; NR; Radio Resource Control (RRC) protocol specification (Release 16)," Mar. 2020, 835 pages.

PCT International Search Report and Written Opinion, mailed Oct. 6, 2021, in connection with International Application No. PCT/EP2021/066268, 12 pages.

3GPP TSG-RAN WG2 #107-bis, R2-1912572 (resubmission of R2-1910028), Chongqing, PRC, Oct. 14-18, 2019, "Report on email discussion [106#46][1AB]: Low-latency scheduling", Samsung (Rapporteur), 52 pages.

3GPP TSG-RAN WG2 meeting #107, R2-1911438, Prague, Czech Republic, Aug. 26-30, 2019, "Enhancements for low-latency IAB Uplink scheduling", Futurewei, 3 pages.

Office Action mailed Jul. 30, 2025 for Chinese Patent Application No. 202180042643.0, 22 pages.

* cited by examiner

METHOD AND APPARATUS FOR BUFFER STATE REPORT

CROSS REFERENCE TO RELATED APPLICATIONS

This application is a 35 U.S.C. § 371 national stage application of PCT International Application No. PCT/EP2021/059623 filed Apr. 14, 2021, which itself is a continuation of PCT International Application No. PCT/EP2020/067214, filed Jun. 19, 2020, the disclosures and contents of which are incorporated by reference herein in their entireties.

TECHNICAL FIELD

The present disclosure relates generally to the technology of wireless communication, and in particular, to a method and an apparatus for a buffer state report of a terminal device.

BACKGROUND

This section introduces aspects that may facilitate better understanding of the present disclosure. Accordingly, the statements of this section are to be read in this light and are not to be understood as admissions about what is in the prior art or what is not in the prior art.

In communication systems, when a terminal device has data to be transmitted to a network node, such as the base station, the terminal device may firstly report to the base station about how much data it has. Such information about how much data it has may be included in a buffer state report, BSR, from the terminal device to the network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. An improved mechanism of BSR may be provided in order to reduce latency for the data transmission from the terminal device to the network node introduced by the BSR procedure.

A first aspect of the present disclosure provides a method performed at a terminal device, comprising: predicting a buffer size associated with data to be transmitted; transmitting a buffer state report, BSR, including the predicted buffer size to a network node.

In embodiments of the present disclosure, the method further comprises: receiving a grant for the data to be transmitted; and transmitting the data.

In embodiments of the present disclosure, the predicting is based on at least one of: a size, a type, a content, or a required transmission rate of the data.

In embodiments of the present disclosure, the predicting is based on at least one of: input data from an application behaviour, a user behaviour, a radio condition, or a traffic behaviour.

In embodiments of the present disclosure, the user behaviour comprises a mobility; and/or the traffic behaviour comprises a traffic pattern.

In embodiments of the present disclosure, the method further comprises: predicting a probability associated with the predicted buffer size.

In embodiments of the present disclosure, the BSR includes the probability.

In embodiments of the present disclosure, the terminal device transmits the BSR, when the probability is equal to or greater than a threshold.

In embodiments of the present disclosure, the threshold is configurable or fixed.

In embodiments of the present disclosure, the predicting is made by an artificial intelligence algorithm.

In embodiments of the present disclosure, the predicting is made by Long Short-Term Memory, LSTM, neural network model, Arima machine learning model, and/or reinforcement learning.

In embodiments of the present disclosure, the method further comprises: receiving a BSR prediction configuration for the terminal device, or for a plurality of terminal devices.

In embodiments of the present disclosure, the terminal device transmits the BSR in uplink shared channel, UL-SCH.

In embodiments of the present disclosure, the terminal device transmits a scheduling request, SR, for the BSR.

In embodiments of the present disclosure, the terminal device transmits the SR according to a SR configuration.

In embodiments of the present disclosure, the SR configuration is received from the network node, or is pre-configured.

In embodiments of the present disclosure, the BSR is configured for a logic channel, or for a logic channel group.

In embodiments of the present disclosure, the BSR is configured based on a priority of the logic channel or the logical channel group.

In embodiments of the present disclosure, the BSR further comprises a buffer size associated with data assigned to a logic channel.

In embodiments of the present disclosure, the method further comprises: reporting a capability of the terminal device for supporting the BSR.

In embodiments of the present disclosure, the BSR further comprises: a predicted time point or time window for transmitting the data.

In embodiments of the present disclosure, the BSR further comprises: a probability of the predicted time point or time window for transmitting the data.

In embodiments of the present disclosure, the predicted buffer size is included in a medium access control, MAC, control element, CE.

In embodiments of the present disclosure, the method further comprises: receiving an indication for whether the BSR including the predicted buffer size is enabled or disabled.

In embodiments of the present disclosure, the method further comprises: transmitting a buffer state report, BSR, including a buffer size associated with data assigned to a logical channel of the terminal device, when the BSR including the predicted buffer size is disabled.

In embodiments of the present disclosure, the indication comprises a threshold for a probability of the predicted buffer size.

In embodiments of the present disclosure, the method further comprises: starting a timer after transmitting the BSR including the predicted buffer size; and/or stopping the timer after receiving the grant.

In embodiments of the present disclosure, the method further comprises: restarting the timer, if the predicted buffer size is updated and the BSR including the predicted buffer size is retransmitted.

In embodiments of the present disclosure, the method further comprises: retransmitting the predicted BSR, when the timer expires.

In embodiments of the present disclosure, the BSR includes a predetermined logical channel identifier, LCID to indicate the predicted buffer size.

In embodiments of the present disclosure, the terminal device comprises a user equipment, UE.

A second aspect of the present disclosure provides a method performed at a network node, comprising: receiving a buffer state report, BSR, including a predicted buffer size associated with data to be received from a terminal device; transmitting a grant for the data according to the received BSR.

In embodiments of the present disclosure, the method further comprises: receiving the data.

In embodiments of the present disclosure, the predicting is based on at least one of: a size, a type, a content, or a required transmission rate of the data.

In embodiments of the present disclosure, the predicting is based on at least one of: input data from an application behaviour, a user behaviour, a radio condition, a traffic behaviour.

In embodiments of the present disclosure, the user behaviour comprises a mobility; and/or the traffic behaviour comprises a traffic pattern.

In embodiments of the present disclosure, the method further comprises: receiving a probability associated with the predicted buffer size.

In embodiments of the present disclosure, the BSR includes the probability.

In embodiments of the present disclosure, the terminal device transmits the BSR, when the probability is equal to or greater than a threshold.

In embodiments of the present disclosure, the threshold is configurable or fixed.

In embodiments of the present disclosure, the method further comprises: configuring a priority to a transmission of the data, based on the probability. The priority is associated with the probability.

In embodiments of the present disclosure, the predicting is made by an artificial intelligence algorithm.

In embodiments of the present disclosure, the predicting is made by Long Short-Term Memory, LSTM, neural network model, Arima machine learning model, and/or reinforcement learning.

In embodiments of the present disclosure, the method further comprises: transmitting a BSR prediction configuration for a terminal device, or for a plurality of terminal devices.

In embodiments of the present disclosure, the terminal device transmits the BSR in uplink shared channel, UL-SCH.

In embodiments of the present disclosure, the terminal device transmits a scheduling request, SR, for the BSR.

In embodiments of the present disclosure, the terminal device transmits the SR according to a SR configuration.

In embodiments of the present disclosure, the SR configuration is transmitted from the network node, or is pre-configured.

In embodiments of the present disclosure, the BSR is configured for a logic channel, or for a logic channel group.

In embodiments of the present disclosure, the BSR is configured based on a priority of the logic channel or the logic channel group.

In embodiments of the present disclosure, the BSR further comprises a buffer size associated with data assigned to a logic channel.

In embodiments of the present disclosure, the method further comprises: receiving a capability of the terminal device for supporting the BSR including the predicted buffer size.

In embodiments of the present disclosure, the BSR further comprises: a predicted time point or time window for transmitting the data.

In embodiments of the present disclosure, the BSR further comprises: a probability of the predicted time point or time window for transmitting the data.

In embodiments of the present disclosure, the predicted buffer size is included in a medium access control, MAC, control element, CE.

In embodiments of the present disclosure, the method further comprises: transmitting an indication for whether the BSR including the predicted buffer size is enabled.

In embodiments of the present disclosure, the method further comprises: receiving a buffer state report, BSR, including a buffer size associated with data assigned to a logical channel of the terminal device, when the BSR including the predicted buffer size is disabled.

In embodiments of the present disclosure, the indication comprises a threshold for a probability of the predicted buffer size.

In embodiments of the present disclosure, the BSR includes a predetermined logical channel identifier, LCID to indicate the predicted buffer size.

In embodiments of the present disclosure, the method further comprises: scheduling another terminal device, based on the predicted buffer size.

In embodiments of the present disclosure, the network node comprises a base station.

A third aspect of the present disclosure provides a terminal device, comprising: a processor; and a memory, the memory containing instructions executable by the processor, whereby the terminal device is operative to: predict a buffer size associated with data to be transmitted; and transmit a buffer state report, BSR, including the predicted buffer size to a network node.

In embodiments of the present disclosure, the terminal device is operative to perform the method according to any of embodiments of the first aspect.

A fourth aspect of the present disclosure provides a network node, comprising: a processor; and a memory, the memory containing instructions executable by the processor, whereby the network node is operative to: receive a buffer state report, BSR, including a predicted buffer size associated with data to be received from a terminal device; and transmit a grant for the data according to the received BSR.

In embodiments of the present disclosure, the network node is operative to perform the method according to any of embodiments of the first aspect.

A fifth aspect of the present disclosure provides a terminal device, comprising: a prediction unit, configured to predict a buffer size associated with data to be transmitted; and a transmission unit, configured to transmit a buffer state report, BSR, including the predicted buffer size to a network node.

A sixth aspect of the present disclosure provides a network node, comprising: a reception unit, configured to receive a buffer state report, BSR, including a predicted buffer size associated with data to be received from a terminal device; and a transmission unit, configured to transmit a grant for the data according to the received BSR.

A seventh aspect of the present disclosure provides a computer-readable storage medium storing instructions which when executed by at least one processor, cause the at least one processor to perform the method according to any one of embodiments of the first and second aspects.

Embodiments herein afford many advantages. According to embodiments of the present disclosure, the terminal device may predict a buffer size associated with data to be transmitted; and transmit a buffer state report, BSR, including the predicted buffer size to a network node. That is, instead of actually assigning the data to any logic channel then calculating the specific buffer size in the logic channel, the BSR may be predicted and transmitted to the network node. Thus, the time for waiting the data to be assigned to any logic channel before the BSR is unnecessary, such that the latency of data transmission from the terminal device to the network node may be reduced.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
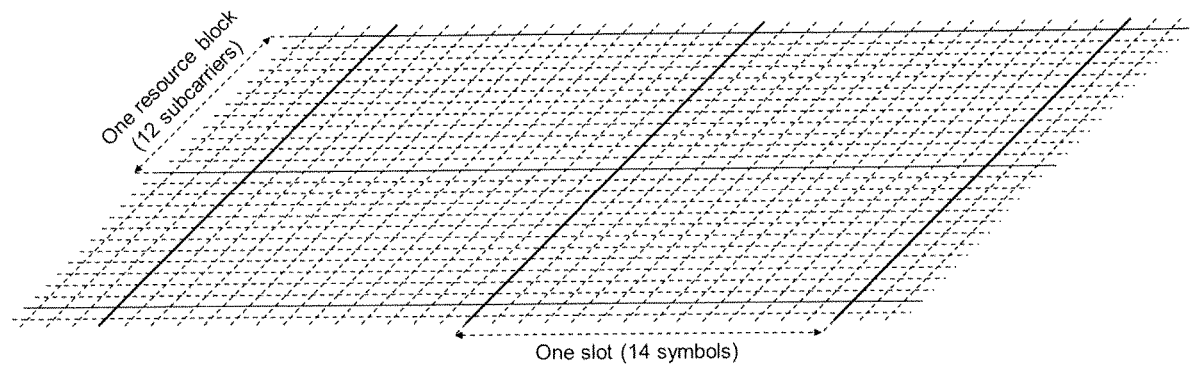
FIG. 1 is an exemplary diagram showing physical resource grids of a communication system.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network node" used herein refers to a network device or network entity or network function or any other devices (physical or virtual) in a communication network. For example, the network node in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "network node" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), etc. In other embodiments, the network function may comprise different types of NFs (such as PCRF (Policy and Charging Rules Function), etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

FIG. 1 is an exemplary diagram showing physical resource grids of a communication system.

Mobile broadband will continue to drive the demands for higher overall traffic capacity and higher achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e. with an infra-structure density considerably higher than the densest networks of today. The wide transmission bandwidths needed to provide data rates up to 10 Gbps and above can likely only be obtained from spectrum allocations in the millimeter-wave bands. High-gain beamforming, typically realized with array antennas, can be used to mitigate the increased pathloss at higher frequencies. Such networks includes, for example, new radio, NR, systems.

NR supports a diverse set of use cases and a diverse set of deployment scenarios. The latter includes deployment at both low frequencies (100s of MHz), and very high frequencies (tens of GHz). Two operation frequency ranges are defined in NR Rel-15: FR (frequency range)1 from 410 MHz to 7125 MHz and FR2 from 24.250 GHz to 52.6 GHz. 3GPP ($3^{rd}$ generation partnership project) RAN (radio aces network) is (in NR Rel-17) studying how to best support NR operation on FR2 frequencies, i.e. from 52.6 GHz to 71 GHz; the study item which includes the following objectives:

Study of required changes to NR using existing DL(downlink)/UL(uplink) NR waveform to support operation between 52.6 GHz and 71 GHz;

Study of applicable numerology including subcarrier spacing, channel BW (bandwidth) (including maximum BW), and their impact to FR2 physical layer design to support system functionality considering practical RF impairments [RAN1, RAN4].

Identify potential critical problems to physical signal/channels, if any [RAN1].

Study of channel access mechanism, considering potential interference to/from other nodes, assuming beam-based operation, in order to comply with the regulatory requirements applicable to unlicensed spectrum for frequencies between 52.6 GHz and 71 GHz [RAN1].

Note: It is clarified that potential interference impact, if identified, may require interference mitigation solutions as part of channel access mechanism.

As shown in FIG. 1, similar to LTE (long term evolution), NR uses OFDM (Orthogonal Frequency Division Multiplexing) in the downlink (i.e. from a network node, gNB, eNB, or base station, to a user equipment or UE). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15 \times 2^\mu)$ kHz where $\mu \in (0,1,2,3,4)$. $\Delta f=15$ kHz is the basic (or reference) subcarrier spacing that is also used in LTE.

In the time domain, downlink and uplink transmissions in NR will be organized into equally-sized subframes of 1 ms each similar to LTE. A subframe is further divided into multiple slots of equal duration. The slot length for subcarrier spacing $\Delta f=(15 \times 2^\mu)$ kHz is $\frac{1}{2}^\mu$ ms. There is only one slot per subframe for $\Delta f=15$ kHz and a slot consists of 14 OFDM symbols.

Downlink transmissions are dynamically scheduled, i.e., in each slot the gNB transmits downlink control information (DCI) about which UE (user equipment) data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including SSB (Synchronization Signal Block), CSI-RS (Channel State Information-Reference Signal), etc.

Uplink data transmissions, carried on Physical Uplink Shared Channel (PUSCH), can also be dynamically scheduled by the gNB by transmitting a DCI, the DCI (which is transmitted in the DL region) always indicates a scheduling time offset so that the PUSCH is transmitted in a slot in the UL region.

As described in the 3GPP TS 38.321 V 16.0.0 clause 5.4.5, the Buffer Status reporting (BSR) procedure is used to provide the serving gNB with information about UL data volume in the MAC (medium access control) entity. In the case of IAB (Integrated Access and Backhaul), it is additionally used by an IAB-MT (mobile termination) to provide its parent IAB-DU (distributed unit) with the information about the amount of the data expected to arrive at the MT of the IAB node from the MAC (medium access control) entity of its child node(s) and or UE(s) connected to it. This BSR is referred to as Pre-emptive BSR.

For any BSR other than a Pre-emptive BSR, RRC configures the following parameters to control the BSR:
periodicBSR-Timer;
retxBSR-Timer;
logicalChannelSR-DelayTimerApplied;
logicalChannelSR-DelayTimer;
logicalChannelSR-Mask;
logicalChannelGroup.

Each logical channel may be allocated to an LCG using the logicalChannelGroup. The maximum number of LCGs is eight. The MAC entity determines the amount of UL data available for a logical channel according to the data volume calculation procedure.

A BSR other than a Pre-emptive BSR shall be triggered if any of the following events occur:
UL data, for a logical channel which belongs to an LCG, becomes available to the MAC entity; and either
this UL data belongs to a logical channel with higher priority than the priority of any logical channel containing available UL data which belong to any LCG; or
none of the logical channels which belong to an LCG contains any available UL data.
in which case the BSR is referred below to as 'Regular BSR';
UL resources are allocated and the number of padding bits is equal to or larger than the size of the Buffer Status Report MAC CE plus its subheader, in which case the BSR is referred below to as 'Padding BSR';
retxBSR-Timer expires, and at least one of the logical channels which belong to an LCG contains UL data, in which case the BSR is referred below to as 'Regular BSR';
periodicBSR-Timer expires, in which case the BSR is referred below to as 'Periodic BSR'.

NOTE 1: When a Regular BSR triggering events occurs for multiple logical channels simultaneously, each logical channel triggers one separate Regular BSR.

If configured, a Pre-emptive BSR may be triggered for the specific case of an IAB-MT if any of the following events occur:
a UL grant is provided to a child IAB node or UE;
a BSR is received from a child IAB node or UE.
For a Regular BSR, the MAC entity shall:
1> if the BSR is triggered for a logical channel for which logicalChannelSR-DelayTimerApplied with value true is configured by upper layers:
2> start or restart the logicalChannelSR-DelayTimer.
1> else:
2> if running, stop the logicalChannelSR-DelayTimer.
For Regular and Periodic BSR, the MAC entity shall:
1> if more than one LCG has data available for transmission when the MAC PDU containing the BSR is to be built:
2> report Long BSR for all LCGs which have data available for transmission.
1> else:
2> report Short BSR.
For a Padding BSR, the MAC entity shall:
1> if the number of padding bits is equal to or larger than the size of the Short BSR plus its subheader but smaller than the size of the Long BSR plus its subheader:
2> if more than one LCG has data available for transmission when the BSR is to be built:
3> if the number of padding bits is equal to the size of the Short BSR plus its subheader:
4> report a Short Truncated BSR of the LCG with the highest priority logical channel with data available for transmission.
3> else:
4> report a Long Truncated BSR of the LCG(s) with the logical channels having data available for transmission following a decreasing order of the highest priority logical channel (with or without data available for transmission) in each of these LCG(s), and in case of equal priority, in increasing order of LCGID.
2> else:
3> report a Short BSR.
1> else if the number of padding bits is equal to or larger than the size of the Long BSR plus its subheader:
2> report a Long BSR for all LCGs which have data available for transmission.
For a Pre-emptive BSR, the MAC entity shall:
1> report a Pre-emptive BSR.
For a BSR triggered by retxBSR-Timer expiry, the MAC entity considers that the logical channel that triggered the BSR is the highest priority logical channel that has data available for transmission at the time the BSR is triggered.

The MAC entity shall:
1> if the Buffer Status reporting procedure determines that at least one BSR other than Pre-emptive BSR has been triggered and not cancelled:
2> if UL-SCH resources are available for a new transmission and the UL-SCH resources can accommodate the BSR MAC CE plus its subheader as a result of logical channel prioritization:
3> instruct the Multiplexing and Assembly procedure to generate the BSR MAC CE(s);
3> start or restart periodicBSR-Timer except when all the generated BSRs are long or short Truncated BSRs;
3> start or restart retxBSR-Timer.
2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was triggered for a logical channel for which logicalChannelSR-Mask is set to false; or
3> if the UL-SCH resources available for a new transmission do not meet the LCP mapping restrictions (see clause 5.4.3.1) configured for the logical channel that triggered the BSR:
4> trigger a Scheduling Request.
1> if the Buffer Status reporting procedure determines that at least one Pre-emptive BSR has been triggered and not cancelled:
2> if UL-SCH resources are available for a new transmission and the UL-SCH resources can accommodate the Pre-emptive BSR MAC CE plus its subheader as a result of logical channel prioritization:
3> instruct the Multiplexing and Assembly procedure to generate the Pre-emptive BSR MAC CE.
2> else:
3> trigger a Scheduling Request.

NOTE 2: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

For the case when Pre-emptive BSR is being sent, a MAC PDU may contain one BSR MAC CE for Pre-emptive BSR, and one BSR MAC CE for BSR other than Pre-emptive BSR. A MAC PDU not containing a BSR MAC CE for Pre-emptive BSR shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs other than Pre-emptive BSR may be cancelled when the UL grant(s) can accommodate all pending data available for transmission but is not sufficient to additionally accommodate the BSR MAC CE plus its subheader. All BSRs other than Pre-emptive BSR triggered prior to MAC PDU assembly shall be cancelled when a MAC PDU (protocol data unit) is transmitted, regardless of LBT (listen before talk) failure indication from lower layers, and this PDU includes a Long or Short BSR MAC CE which contains buffer status up to (and including) the last event that triggered a BSR prior to the MAC PDU assembly. A Pre-emptive BSR shall be cancelled when a MAC PDU is transmitted and this PDU includes the corresponding Pre-emptive BSR MAC CE.

NOTE 3: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

NOTE 4: Pre-emptive BSR may be used for the case of dual-connected IAB node. It is up to network implementation to work out the associated MAC entity or entities, and the associated expected amount of data. For the case of dual-connected IAB node, there may be ambiguity in Pre-emptive BSR calculations and interpretation by the receiving nodes in case where BH (Backhaul) RLC (radio link control) channels mapped to different egress Cell Groups are not mapped to different ingress LCGs.

NOTE 5: If a HARQ (Hybrid Automatic Repeat reQuest) process is configured with cg-RetransmissionTimer and if the BSR is already included in a MAC PDU for transmission by this HARQ process, but not yet transmitted by lower layers, it is up to UE implementation how to handle the BSR content.

Figure 2A:
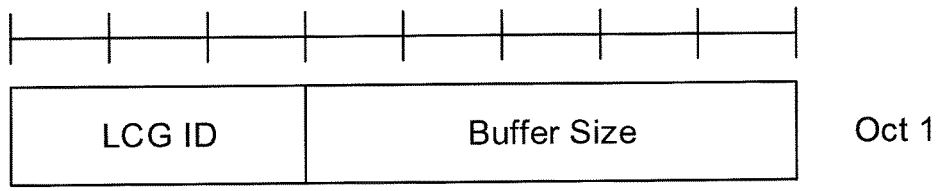
FIG. 2A is an exemplary structure of an element in a BSR.
Figure 2B:
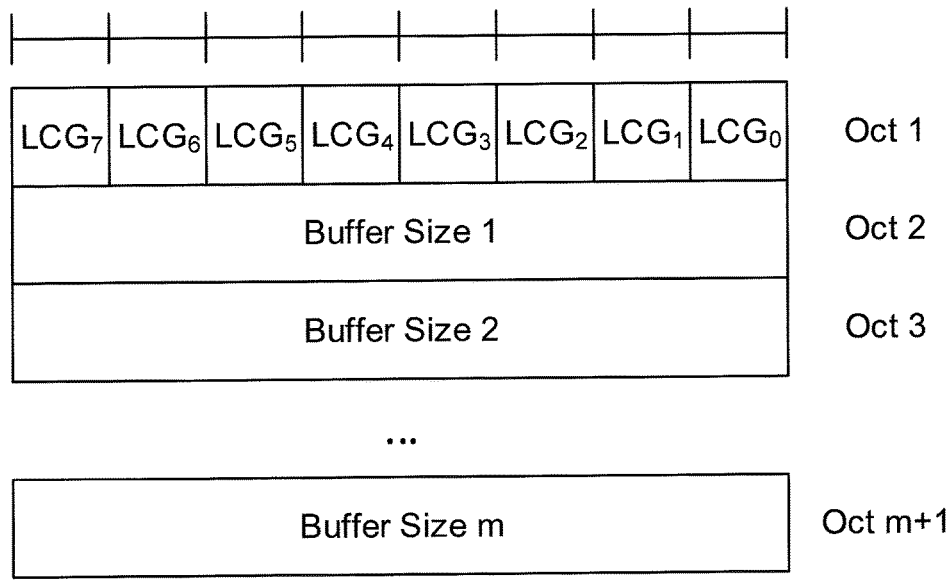
FIG. 2B is an exemplary structure of elements in a BSR.

FIG. 2A is an exemplary structure of an element in a BSR; FIG. 2B is another exemplary structure of elements in a BSR. 5-bit and 8-bit Buffer Size fields are shown in FIG. 2A and FIG. 2B respectively.

Buffer Status Report (BSR) MAC CEs consist of either:
Short BSR format (fixed size); or
Long BSR format (variable size); or
Short Truncated BSR format (fixed size);
Long Truncated BSR format (variable size); or
Pre-emptive BSR format (variable size).

The BSR formats are identified by MAC subheaders with LCIDs, including fields in the BSR MAC CE defined as follows:

LCG ID: The Logical Channel Group ID field identifies the group of logical channel(s) whose buffer status is being reported. The length of the field is 3 bits;

LCGi: For the Long BSR format, this field indicates the presence of the Buffer Size field for the logical channel group i. The LCGi field set to 1 indicates that the Buffer Size field for the logical channel group i is reported. The LCGi field set to 0 indicates that the Buffer Size field for the logical channel group i is not reported. For the Long Truncated BSR format, this field indicates whether logical channel group i has data available. The LCGi field set to 1 indicates that logical channel group i has data available. The LCGi field set to 0 indicates that logical channel group i does not have data available;

Buffer Size: The Buffer Size field identifies the total amount of data available according to the data volume calculation procedure in TS (technical specification)s 38.322 V 16.0.0 and 38.323 V 16.0.0 across all logical channels of a logical channel group after the MAC PDU has been built (i.e. after the logical channel prioritization procedure, which may result the value of the Buffer Size field to zero). The amount of data is indicated in number of bytes. The size of the RLC and MAC headers are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in table 1 and table 2, respectively. For the Long BSR format and the Long Truncated BSR format, the Buffer Size fields are included in ascending order based on the LCGi. For the Long Truncated BSR format the number of Buffer Size fields included is maximised, while not exceeding the number of padding bits. For the Pre-emptive BSR, the Buffer Size field identifies the total amount of the data expected to arrive at the IAB-MT of the node where the Pre-emptive BSR is triggered. Pre-emptive BSR is identical to the Long BSR format.

NOTE 1: For the Pre-emptive BSR, if configured, the LCGs to be reported, the expected data volume calculation, the exact time to report Pre-emptive BSR and the associated LCH are left to implementation.

NOTE 2: The mapping of LCGs between the ingress and egress links of an IAB node for purposes of determining expected change in occupancy of IAB-MT buffers (to be reported as Pre-emptive BSR) is left to implementation.

NOTE 3: The number of the Buffer Size fields in the Long BSR and Long Truncated BSR format can be zero.

TABLE 1

Buffer size levels (in bytes) for 5-bit Buffer Size field in 3GPP TS 38.321 V 16.0.0

| Index | BS value |
|---|---|
| 0 | 0 |
| 1 | ≤10 |
| 2 | ≤14 |
| 3 | ≤20 |

TABLE 1-continued

Buffer size levels (in bytes) for 5-bit Buffer Size field in 3GPP TS 38.321 V 16.0.0

| Index | BS value |
|---|---|
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

TABLE 2

Buffer size levels (in bytes) for 8-bit Buffer Size field in 3FPP TS 38.321 V 16.0.0

| Index | BS value |
|---|---|
| 0 | 0 |
| 1 | ≤10 |
| 2 | ≤11 |
| 3 | ≤12 |
| 4 | ≤13 |
| 5 | ≤14 |
| 6 | ≤15 |
| 7 | ≤16 |
| 8 | ≤17 |
| 9 | ≤18 |
| 10 | ≤19 |
| 11 | ≤20 |
| 12 | ≤22 |
| 13 | ≤23 |
| 14 | ≤25 |
| 15 | ≤26 |
| 16 | ≤28 |
| 17 | ≤30 |
| 18 | ≤32 |
| 19 | ≤34 |
| 20 | ≤36 |
| 21 | ≤38 |
| 22 | ≤40 |
| 23 | ≤43 |
| 24 | ≤46 |
| 25 | ≤49 |
| 26 | ≤52 |
| 27 | ≤55 |
| 28 | ≤59 |
| 29 | ≤62 |
| 30 | ≤66 |
| 31 | ≤71 |
| 32 | ≤75 |
| 33 | ≤80 |
| 34 | ≤85 |
| 35 | ≤91 |

TABLE 2-continued

Buffer size levels (in bytes) for 8-bit Buffer Size field in 3FPP TS 38.321 V 16.0.0

| Index | BS value |
|---|---|
| 36 | ≤97 |
| 37 | ≤103 |
| 38 | ≤110 |
| 39 | ≤117 |
| 40 | ≤124 |
| 41 | ≤132 |
| 42 | ≤141 |
| 43 | ≤150 |
| 44 | ≤160 |
| 45 | ≤170 |
| 46 | ≤181 |
| 47 | ≤193 |
| 48 | ≤205 |
| 49 | ≤218 |
| 50 | ≤233 |
| 51 | ≤248 |
| 52 | ≤264 |
| 53 | ≤281 |
| 54 | ≤299 |
| 55 | ≤318 |
| 56 | ≤339 |
| 57 | ≤361 |
| 58 | ≤384 |
| 59 | ≤409 |
| 60 | ≤436 |
| 61 | ≤464 |
| 62 | ≤494 |
| 63 | ≤526 |
| 64 | ≤560 |
| 65 | ≤597 |
| 66 | ≤635 |
| 67 | ≤677 |
| 68 | ≤720 |
| 69 | ≤767 |
| 70 | ≤817 |
| 71 | ≤870 |
| 72 | ≤926 |
| 73 | ≤987 |
| 74 | ≤1051 |
| 75 | ≤1119 |
| 76 | ≤1191 |
| 77 | ≤1269 |
| 78 | ≤1351 |
| 79 | ≤1439 |
| 80 | ≤1532 |
| 81 | ≤1631 |
| 82 | ≤1737 |
| 83 | ≤1850 |
| 84 | ≤1970 |
| 85 | ≤2098 |
| 86 | ≤2234 |
| 87 | ≤2379 |
| 88 | ≤2533 |
| 89 | ≤2698 |
| 90 | ≤2873 |
| 91 | ≤3059 |
| 92 | ≤3258 |
| 93 | ≤3469 |
| 94 | ≤3694 |
| 95 | ≤3934 |
| 96 | ≤4189 |
| 97 | ≤4461 |
| 98 | ≤4751 |
| 99 | ≤5059 |
| 100 | ≤5387 |
| 101 | ≤5737 |
| 102 | ≤6109 |
| 103 | ≤6506 |
| 104 | ≤6928 |
| 105 | ≤7378 |
| 106 | ≤7857 |
| 107 | ≤8367 |
| 108 | ≤8910 |
| 109 | ≤9488 |
| 110 | ≤10104 |

TABLE 2-continued

Buffer size levels (in bytes) for 8-bit Buffer Size field in 3FPP TS 38.321 V 16.0.0

| Index | BS value |
|---|---|
| 111 | ≤10760 |
| 112 | ≤11458 |
| 113 | ≤12202 |
| 114 | ≤12994 |
| 115 | ≤13838 |
| 116 | ≤14736 |
| 117 | ≤15692 |
| 118 | ≤16711 |
| 119 | ≤17795 |
| 120 | ≤18951 |
| 121 | ≤20181 |
| 122 | ≤21491 |
| 123 | ≤22885 |
| 124 | ≤24371 |
| 125 | ≤25953 |
| 126 | ≤27638 |
| 127 | ≤29431 |
| 128 | ≤31342 |
| 129 | ≤33376 |
| 130 | ≤35543 |
| 131 | ≤37850 |
| 132 | ≤40307 |
| 133 | ≤42923 |
| 134 | ≤45709 |
| 135 | ≤48676 |
| 136 | ≤51836 |
| 137 | ≤55200 |
| 138 | ≤58784 |
| 139 | ≤62599 |
| 140 | ≤66663 |
| 141 | ≤70990 |
| 142 | ≤75598 |
| 143 | ≤80505 |
| 144 | ≤85730 |
| 145 | ≤91295 |
| 146 | ≤97221 |
| 147 | ≤103532 |
| 148 | ≤110252 |
| 149 | ≤117409 |
| 150 | ≤125030 |
| 151 | ≤133146 |
| 152 | ≤141789 |
| 153 | ≤150992 |
| 154 | ≤160793 |
| 155 | ≤171231 |
| 156 | ≤182345 |
| 157 | ≤194182 |
| 158 | ≤206786 |
| 159 | ≤220209 |
| 160 | ≤234503 |
| 161 | ≤249725 |
| 162 | ≤265935 |
| 163 | ≤283197 |
| 164 | ≤301579 |
| 165 | ≤321155 |
| 166 | ≤342002 |
| 167 | ≤364202 |
| 168 | ≤387842 |
| 169 | ≤413018 |
| 170 | ≤439827 |
| 171 | ≤468377 |
| 172 | ≤498780 |
| 173 | ≤531156 |
| 174 | ≤565634 |
| 175 | ≤602350 |
| 176 | ≤641449 |
| 177 | ≤683087 |
| 178 | ≤727427 |
| 179 | ≤774645 |
| 180 | ≤824928 |
| 181 | ≤878475 |
| 182 | ≤935498 |
| 183 | ≤996222 |
| 184 | ≤1060888 |
| 185 | ≤1129752 |
| 186 | ≤1203085 |
| 187 | ≤1281179 |
| 188 | ≤1364342 |
| 189 | ≤1452903 |
| 190 | ≤1547213 |
| 191 | ≤1647644 |
| 192 | ≤1754595 |
| 193 | ≤1868488 |
| 194 | ≤1989774 |
| 195 | ≤2118933 |
| 196 | ≤2256475 |
| 197 | ≤2402946 |
| 198 | ≤2558924 |
| 199 | ≤2725027 |
| 200 | ≤2901912 |
| 201 | ≤3090279 |
| 202 | ≤3290873 |
| 203 | ≤3504487 |
| 204 | ≤3731968 |
| 205 | ≤3974215 |
| 206 | ≤4232186 |
| 207 | ≤4506902 |
| 208 | ≤4799451 |
| 209 | ≤5110989 |
| 210 | ≤5442750 |
| 211 | ≤5796046 |
| 212 | ≤6172275 |
| 213 | ≤6572925 |
| 214 | ≤6999582 |
| 215 | ≤7453933 |
| 216 | ≤7937777 |
| 217 | ≤8453028 |
| 218 | ≤9001725 |
| 219 | ≤9586039 |
| 220 | ≤10208280 |
| 221 | ≤10870913 |
| 222 | ≤11576557 |
| 223 | ≤12328006 |
| 224 | ≤13128233 |
| 225 | ≤13980403 |
| 226 | ≤14887889 |
| 227 | ≤15854280 |
| 228 | ≤16883401 |
| 229 | ≤17979324 |
| 230 | ≤19146385 |
| 231 | ≤20389201 |
| 232 | ≤21712690 |
| 233 | ≤23122088 |
| 234 | ≤24622972 |
| 235 | ≤26221280 |
| 236 | ≤27923336 |
| 237 | ≤29735875 |
| 238 | ≤31666069 |
| 239 | ≤33721553 |
| 240 | ≤35910462 |
| 241 | ≤38241455 |
| 242 | ≤40723756 |
| 243 | ≤43367187 |
| 244 | ≤46182206 |
| 245 | ≤49179951 |
| 246 | ≤52372284 |
| 247 | ≤55771835 |
| 248 | ≤59392055 |
| 249 | ≤63247269 |
| 250 | ≤67352729 |
| 251 | ≤71724679 |
| 252 | ≤76380419 |
| 253 | ≤81338368 |
| 254 | >81338368 |
| 255 | Reserved |

Figure 3:
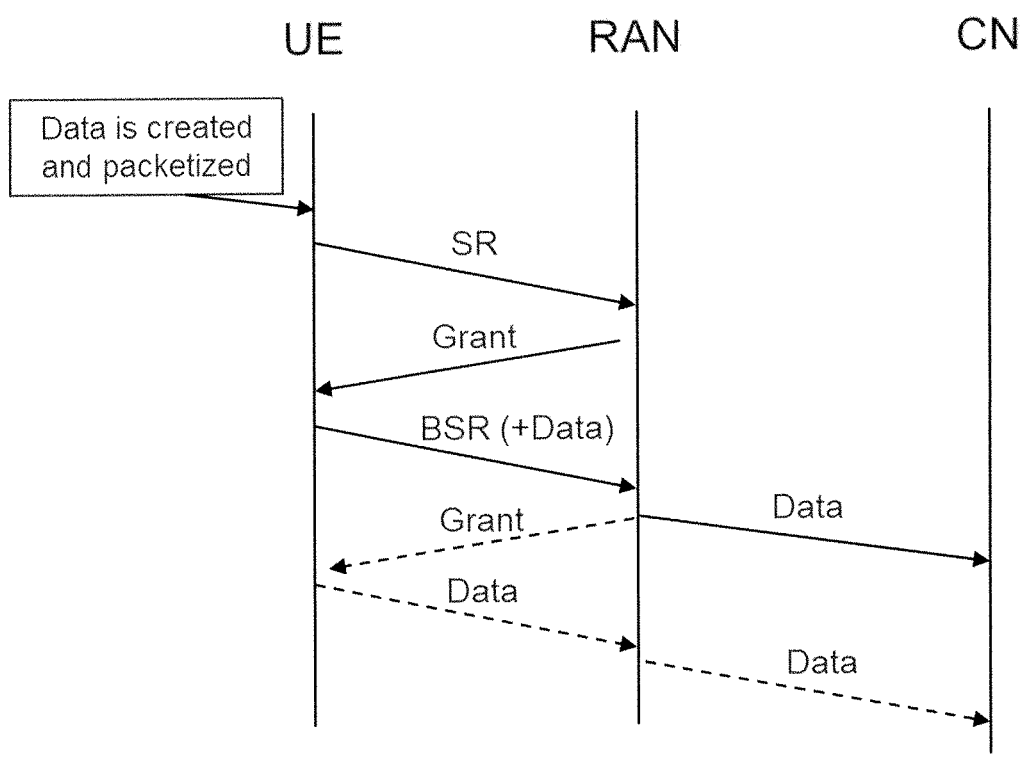
FIG. 3 is an exemplary flowchart showing a UL transmission.

FIG. 3 is an exemplary flowchart showing a UL transmission.

As shown in FIG. 3, the transmission delay for a UL packet using a dynamic grant, can be estimated considering the below delay components:

UL latency=SR transmission time+SR processing time+grant transmission time+UE processing/ encoding time+data transmission time+gNB processing/decoding    (1)

A pre-emptive BSR is introduced in NR Rel-16 for an Integrated Access and Backhaul-Mobile Termination (IAB-MT) to indicate to its parent IAB node that there will be new data received from its child node. As specified in TS 38.321 V 16.0.0 clause 5.4.5, a pre-emptive BSR can be triggered for an IAB-MT for the below conditions:

UL grant is provided to child IAB node or UE;
BSR is received from child IAB node or UE.

For an IAB-MT, pre-emptive BSR is an optional feature. This feature is activated in case the IAB-MT has received an RRC (Radio Resource Control) parameter usePreBSR set as 'True'.

With a pre-emptive BSR in an IAB-MT, its parent node can schedule grants to this IAB-MT in advance of new data arriving at this IAB-MT. The latency caused by SR/BSR transmission to its parent node is therefore avoided. In other words, the delay components "SR transmission time+SR processing time+grant transmission time+UE processing time" in the formula (1) can be saved.

However, the information from the child IAB node or UE about the accurate buffer size in a logic channel of the child IAB node or UE is still necessary. That is, the "SR transmission time+SR processing time+grant transmission time+ UE processing time" for the child IAB node, or particularly the UE is unavoidable.

Figure 4A:
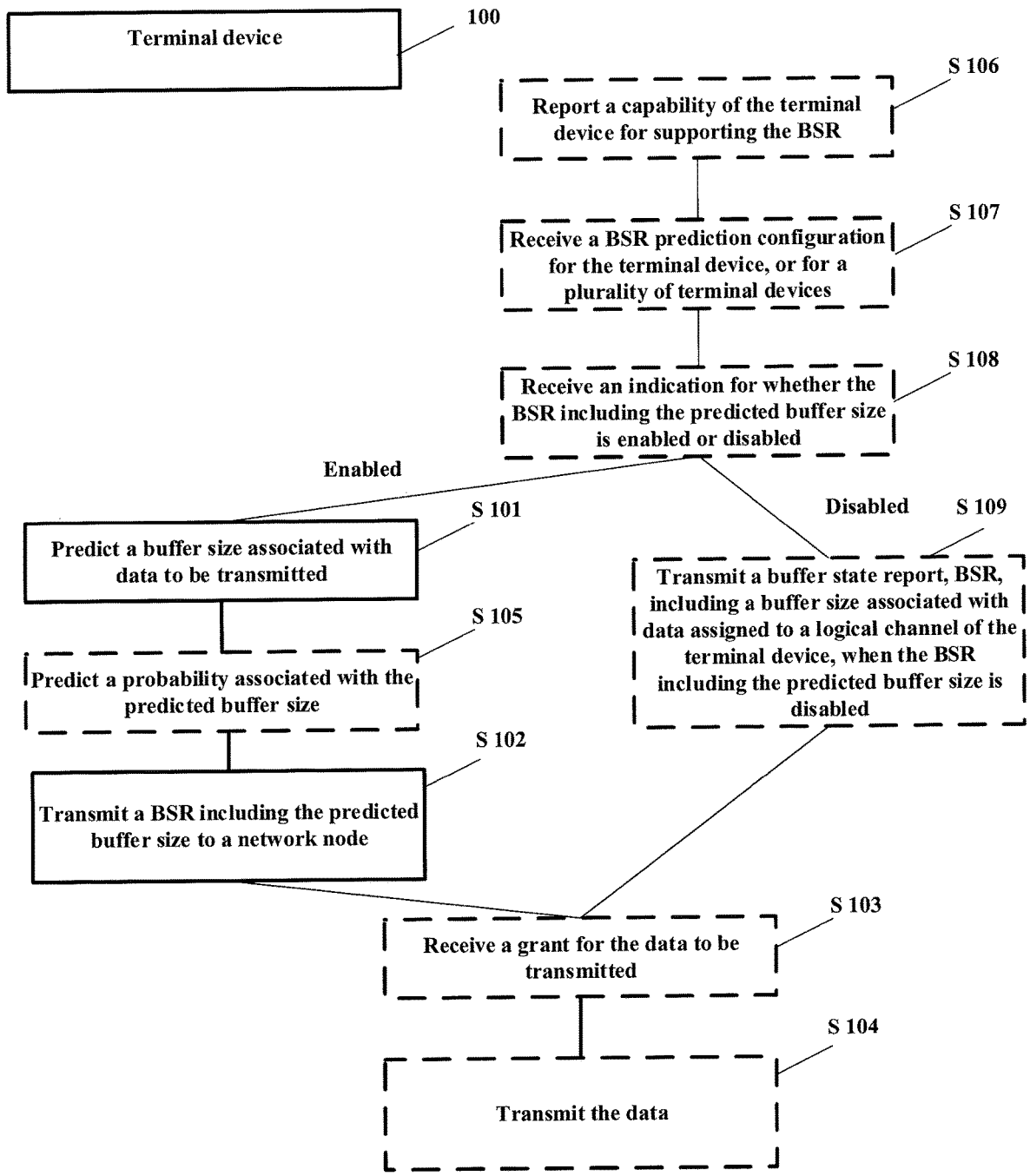
FIG. 4A is an exemplary flowchart showing a method performed at a terminal device, according to embodiments of the present disclosure.

FIG. 4A is an exemplary flowchart showing a method performed at a terminal device, according to embodiments of the present disclosure. Optional steps are presented in the dashed blocks.

As shown in FIG. 4A, the method performed at a terminal device may comprise: S101, predicting a buffer size associated with data to be transmitted; and S102, transmitting a buffer state report, BSR, including the predicted buffer size to a network node.

According to embodiments of the present disclosure, the terminal device may predict a buffer size associated with data to be transmitted; and transmit a buffer state report, BSR, including the predicted buffer size to a network node. That is, instead of actually assigning the data to any logic channel then calculating the specific buffer size in the logic channel, the BSR may be predicted and transmitted to the network node. Thus, the time for waiting the data to be assigned to any logic channel before the BSR is unnecessary, such that the latency of data transmission from the terminal device to the network node may be reduced, no matter the terminal device is an IAB-MT or not.

According to embodiments of the present disclosure, a predicted buffer size may be obtained in any type of terminal device. This is beneficial for future 3GPP releases and even 6G (sixth generation) for support of extremely high data rates in UL.

In embodiments of the present disclosure, the terminal device transmits a scheduling request, SR, for the BSR. Particularly, the terminal device transmits the SR according to a specific SR configuration for a predicted buffer size.

In embodiments of the present disclosure, the SR configuration is received from the network node, or is pre-configured. For example, the SR configuration may be fixed in the terminal device, according to any communication standards, or 3GPP TS.

In embodiments of the present disclosure, the terminal device transmits the BSR in uplink shared channel, UL-SCH, which may be granted corresponding to the SR, or already available to the terminal device.

Specifically, the predicted buffer size is included in a medium access control, MAC, control element, CE.

In embodiments of the present disclosure, the BSR is configured for a logic channel, or for a logic channel group.

In embodiments of the present disclosure, the BSR is configured based on a priority of the logic channel or the logical channel group. That is, a logic channel or a logical channel group with higher priority may be configured with the BSR including the predicted buffer size.

In embodiments of the present disclosure, the terminal device comprises a user equipment, UE.

In embodiments of the present disclosure, the method further comprises: S103, receiving a grant for the data to be transmitted; and S104, transmitting the data.

According to embodiments of the present disclosure, the terminal device may receive the grant for the data to be transmitted, regardless of whether the data is already prepared in the logical channel. Thus, it is possible for the data to be transmitted without any latency as long as it is prepared in the logic channel.

In embodiments of the present disclosure, the predicting is based on at least one of: a size, a type, a content, or a required transmission rate of the data.

According to embodiments, the terminal device may make the predicting as soon as obtaining the data itself or at least some information of the data, such as the size, a type, a content, or a required transmission rate. For example, the terminal device may be a mobile phone to transmit a multi-media file selected by a user, or the terminal device may be a vehicle to transmit a state report message automatically. When the multi-media file is selected, or when the text of the state report message is generated, even before these data are assigned to a specific logic channel, the terminal device may predict a buffer size, and transmit a BSR including the predicted buffer size, so as to reduce the latency.

In embodiments of the present disclosure, the predicting is based on at least one of: input data from an application behaviour, a user behaviour, a radio condition, or a traffic behaviour.

In embodiments of the present disclosure, the user behaviour comprises a mobility; and/or the traffic behaviour comprises a traffic pattern.

According to embodiments, the terminal device may make the predicting even before obtaining the data itself or information of the data. For example, when a user starts a social software/application, the terminal device may predict that the user will start a video call, or upload a video blog soon. The terminal device may transmit BSR based on such prediction and receive the grant in advance, even there is no actual data generated yet. Then, when the data stream of the video call or video blog is generated and assigned to any logic channel by the terminal device, it can be transmitted immediately. Further, based on the transmission rate of the continuous data stream, the grant for the future transmission part of the data stream can be always obtained in advance, the latency may be reduced, and the continuity of the video call/video blog may be improved.

In other examples, the prediction may be made based on user mobility, such as a position of the user (e.g. in office, or at home, or amusement park). The prediction may also be based on whether the radio condition is good or not. Further, the prediction may also be based on any information about the traffic pattern, such as whether it is a traffic of mMTC: Massive Machine Type Communication, URLLC: Ultra Reliable Low Latency Communication, or eMBB: Enhanced Mobile Broadband. In other examples, a traffic pattern may be reflected by traffic bit rate range, traffic packet arrival interval, traffic packet size etc. A specific traffic type may have specific bit rate range, and/or packet arrival interval, and/or packet size. Based on such information, the terminal device may be able to determine the associated traffic type.

In embodiments of the present disclosure, the predicting is made by an artificial intelligence algorithm.

In embodiments of the present disclosure, the predicting is made by Long Short-Term Memory, LSTM, neural network model, Arima machine learning model, and/or reinforcement learning.

According to an artificial intelligence algorithm, a continuous prediction may be automatically made based on a plurality of circumstance parameters, even in case that a fixed/accurate mathematic mapping relationship is hard to be obtained.

As shown in the FIG. 4A, the method further comprises: S105, predicting a probability associated with the predicted buffer size.

Such probability (i.e. a confidence level of the prediction) may function as a basis for further actions of both the terminal device and the network node, to avoid assigning communication resource for data with rather low possibility to be transmitted.

In embodiments of the present disclosure, the BSR includes the probability, such that the network node may decide whether to give grant to the terminal device, based on the probability.

In embodiments of the present disclosure, the terminal device transmits the BSR, when the probability is equal to or greater than a threshold. That is, when the probability is rather low, the terminal device does not transmit such predicted buffer size at all.

In embodiments of the present disclosure, the threshold is configurable or fixed.

In embodiments of the present disclosure, the BSR further comprises: a predicted time point or time window for transmitting the data. Particularly, the BSR further comprises: a probability of the predicted time point or time window for transmitting the data.

As shown in FIG. 4A, the method further comprises: S106, reporting a capability of the terminal device for supporting the BSR; S107, receiving a BSR prediction configuration for the terminal device, or for a plurality of terminal devices; S108, receiving an indication for whether the BSR including the predicted buffer size is enabled or disabled; S109, transmitting a buffer state report, BSR, including a buffer size associated with data assigned to a logical channel of the terminal device, when the BSR including the predicted buffer size is disabled.

In embodiments of the present disclosure, the indication comprises the threshold for a probability of the predicted buffer size.

According to embodiments of the present disclosure, BSR prediction configuration may be specific for a terminal device, or common to a plurality of terminal devices. Further, the terminal device may still utilize a regular BSR with actual buffer size, when the predicted buffer size is disabled.

In embodiments of the present disclosure, the BSR further comprises a buffer size associated with data assigned to a logic channel. That is, an actual buffer size in a logic channel with assigned data may also be included in the BSR at the same time.

Particularly, the BSR includes a predetermined logical channel identifier, LCID to indicate the predicted buffer size, so as to distinguish the predicted buffer size and the actual buffer size. Alternatively or additionally, there may be specific field/bits in the BSR to indicate which buffer size is a predicted one.

Figure 4B:
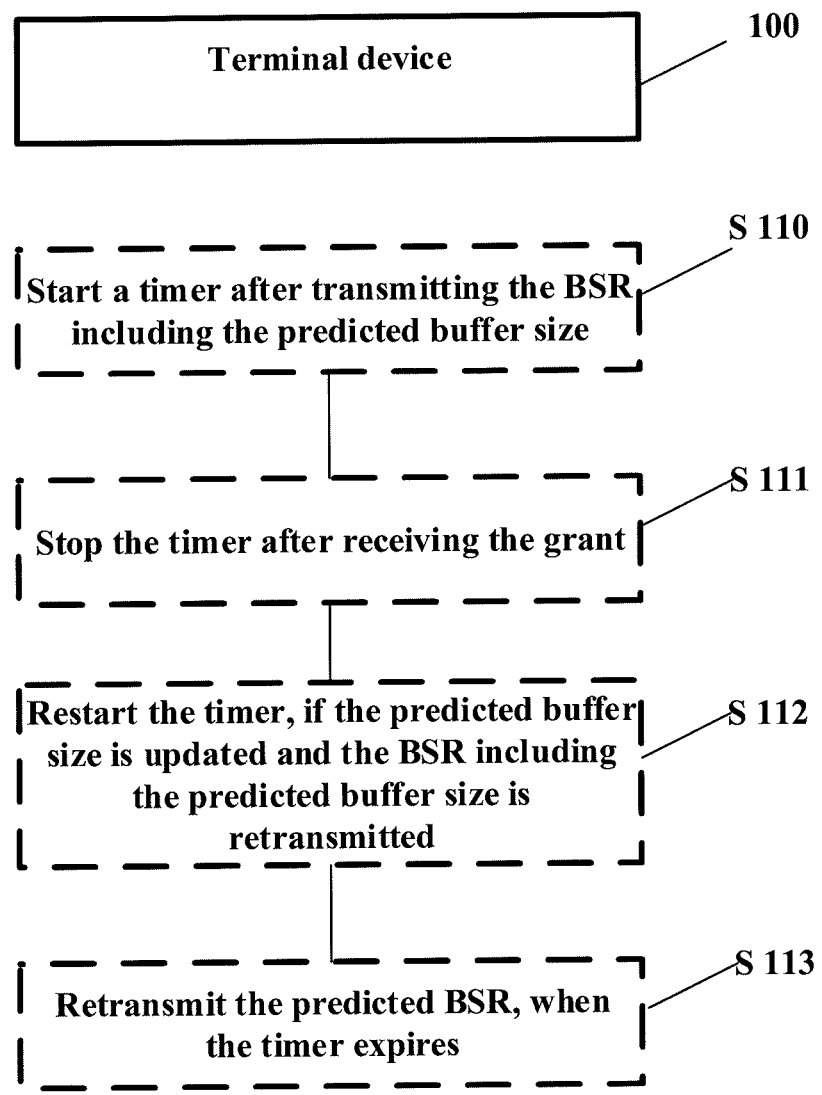
FIG. 4B is an exemplary flowchart showing additional steps of the method shown in FIG. 4A.

FIG. 4B is an exemplary flowchart showing additional steps of the method shown in FIG. 4A.

As shown in FIG. 4B, the method further comprises: S110, starting a timer after transmitting the BSR including the predicted buffer size; S111, stopping the timer after receiving the grant; S112, restarting the timer, if the predicted buffer size is updated and the BSR including the predicted buffer size is retransmitted, and/or S113, retransmitting the predicted BSR, when the timer expires.

According to embodiments of the present disclosure, the terminal device may utilize at least one timer for the predicted buffer size, for example, the same predicted buffer size cannot be retransmitted if the timer does not expire. However, if the new prediction or the actual buffer size, which is different with the transmitted one, is obtained before the grant, the new prediction or the actual buffer size may be transmitted and the timer may be restarted.

According to embodiments of the present disclosure, both principle and details about how to provide a predicted buffer size are illustrated above. Under such embodiments, the latency due to BSR may be reduced in the communication system.

Figure 5A:
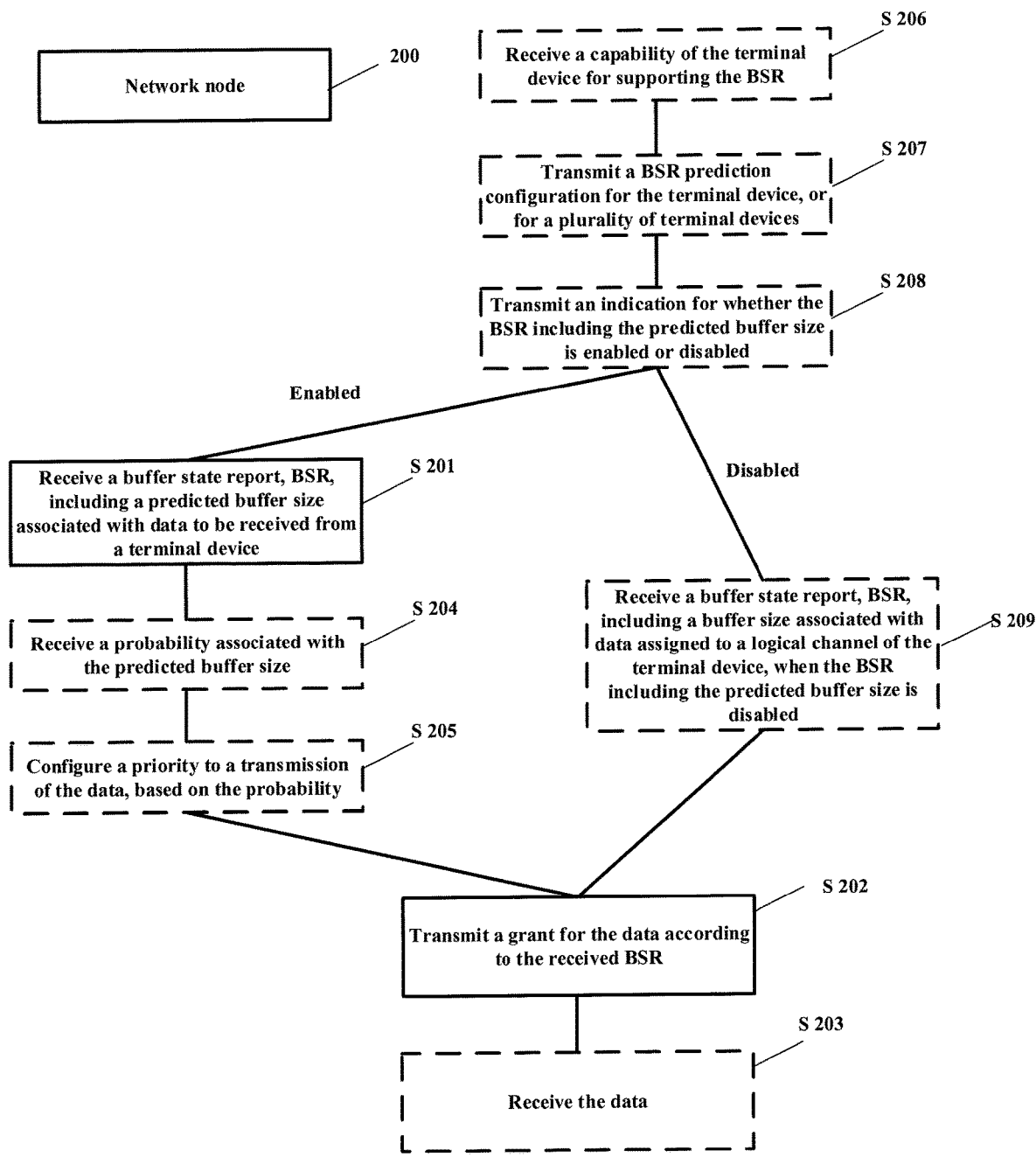
FIG. 5A is an exemplary flowchart showing a method performed at a network node, according to embodiments of the present disclosure.

FIG. 5A is an exemplary flowchart showing a method performed at a network node, according to embodiments of the present disclosure.

As shown in FIG. 5A, a method performed at a network node may comprise: S201, receiving a buffer state report, BSR, including a predicted buffer size associated with data to be received from a terminal device; and S202, transmitting a grant for the data according to the received BSR.

In embodiments of the present disclosure, the method further comprises: S203, receiving the data.

In embodiments of the present disclosure, the network node comprises a base station.

According to embodiments of the present disclosure, the network node may grant communication resource for the terminal device, based on the predicted buffer size. That is, instead of waiting for actual buffer size associating with data assigned to the logic channel of the terminal device, the network node may transmit grant in advance. Thus, the time for waiting the data to be assigned to any logic channel before the BSR is unnecessary, such that the latency of data transmission from the terminal device to the network node may be reduced.

As shown in FIG. 5A, the method further comprises: S204, receiving a probability associated with the predicted buffer size; and S205, configuring a priority to a transmission of the data, based on the probability. The priority is associated with the probability. For example, the bigger the probability is, the higher the priority may be. Further, the priority may be in direct proportion to the probability.

According to the embodiments of the present disclosure, a predicted data transmission with higher probability may be granted earlier than a predicted data transmission with lower probability. Then efficiency for the communication resource may be improved.

As shown in FIG. 5A, the method further comprises: S206, receiving a capability of the terminal device for supporting the BSR including the predicted buffer size; S207, transmitting a BSR prediction configuration for a terminal device, or for a plurality of terminal devices; S208, transmitting an indication for whether the BSR including the predicted buffer size is enabled or disabled; and S209, receiving a buffer state report, BSR, including a buffer size associated with data assigned to a logical channel of the terminal device, when the BSR including the predicted buffer size is disabled.

According to embodiments of the present disclosure, BSR prediction configuration may be specific for a terminal device, or common to a plurality of terminal devices. Further, the terminal device may still utilize a regular BSR with actual buffer size, when the predicted buffer size is disabled.

Figure 5B:
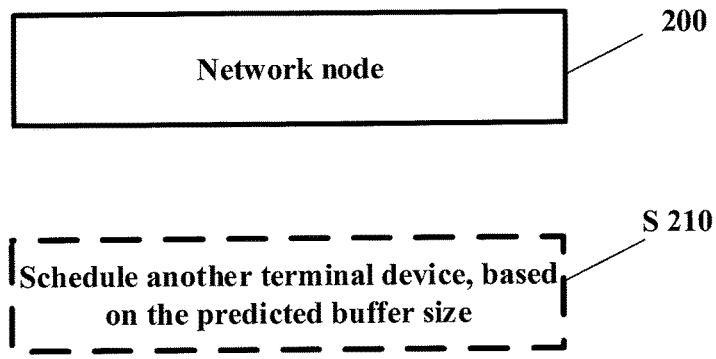
FIG. 5B is an exemplary flowchart showing additional steps of the method shown in FIG. 5A.

FIG. 5B is an exemplary flowchart showing additional steps of the method shown in FIG. 5A.

As shown in FIG. 5B, the method further comprises: S210, scheduling another terminal device, based on the predicted buffer size. For example, the another terminal device may be in vicinity to the terminal device.

According to embodiments of the present disclosure, the network node may further initiatively schedule other terminal devices in vicinity to the terminal device (e.g. in the same cell, same office, same home, etc.), based on the prediction from the terminal device. The latency for the other terminal devices may be further reduced, and they can expect planned communication resources even before they transmit BSR.

Figure 6:
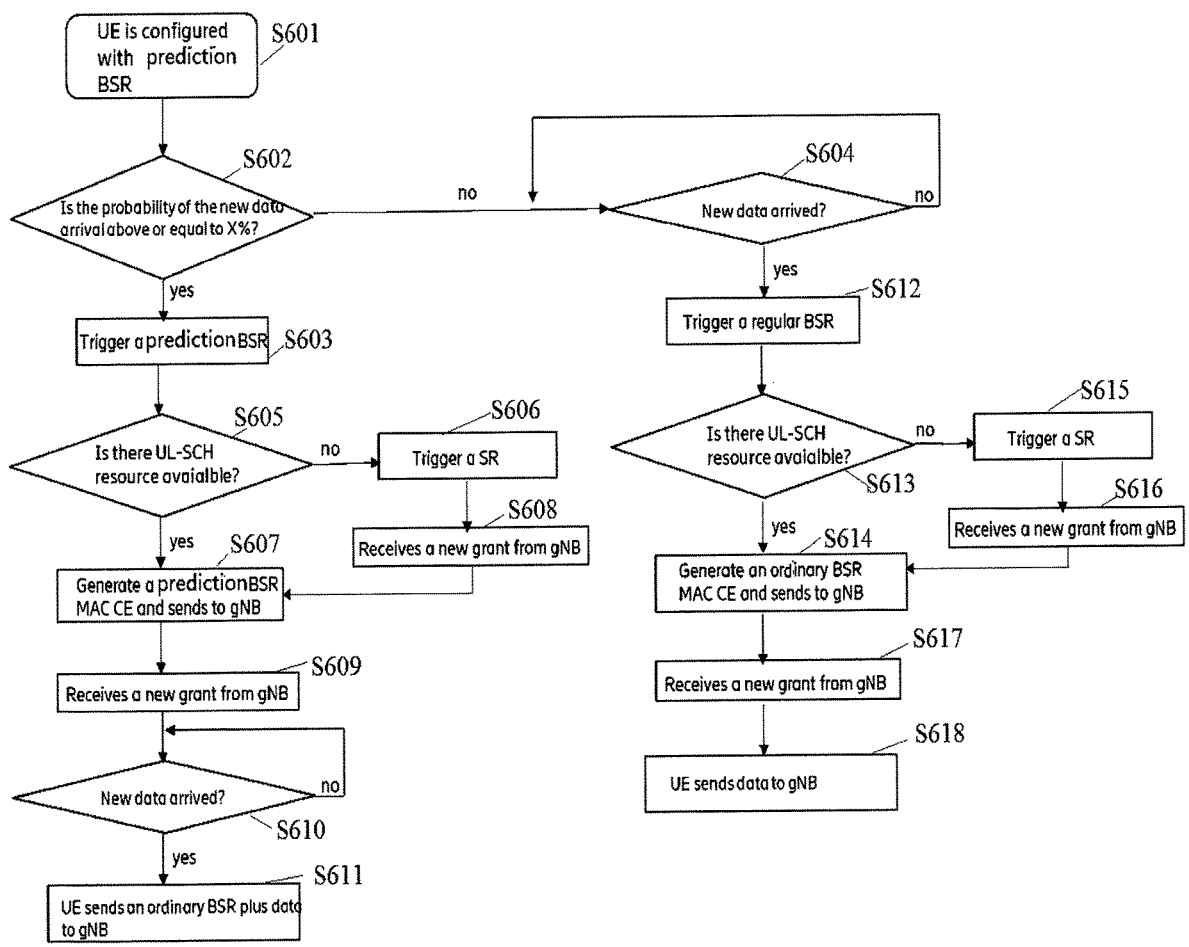
FIG. 6 is an exemplary flowchart showing an overview of procedure for transmitting the BSR, according to embodiments of the present disclosure.

FIG. 6 is an exemplary flowchart showing an overview of procedure for transmitting the BSR, according to embodiments of the present disclosure.

As shown in FIG. 6, in S601, the UE may be configured with prediction BSR, e.g. the UE has the capability and is enabled to transmit a BSR including predicted buffer size. Then the flow goes to S602.

In S602, the UE makes prediction about new data arrival and determines whether the probability of the new data arrival above or equal to a threshold X %. If yes, the flow goes to S603. If no, the flow goes to S604.

In S603, the UE triggers the prediction BSR. Then the flow goes to S605.

In S605, the UE determines whether there is UL-SCH resource available. If yes, the flow goes to S607. If no, the flow goes to S606.

In S606, the UE triggers a SR. Then the flow goes to S608.

In S608, the UE receives a new grant from gNB for the BSR. Then the flow goes to S607.

In S607, the UE generate a prediction BSR MAC CE including predicted buffer size associated with the possible new data, and sends it to gNB. Then the flow goes to S609.

In S609, the UE receives a new grant for gNB for the data. Then the flow goes to S610.

In S610, the UE waits for the data to arrive. Then the flow goes to S611, when the data arrives.

In S611, the UE transmits an ordinary/regular BSR plus data to gNB.

In S604, the UE waits for the data to arrive. Then the flow goes to S612, when the data arrives.

In S612, the UE triggers the regular BSR. Then the flow goes to S613.

In S613, the UE determines whether there is UL-SCH resource available. If yes, the flow goes to S614. If no, the flow goes to S615.

In S615, the UE triggers a SR. Then the flow goes to S616.

In S616, the UE receives a new grant from gNB for the BSR. Then the flow goes to S614.

In S614, the UE generate an ordinary BSR MAC CE including actual buffer size associated with the arrived new data, and sends it to gNB. Then the flow goes to S617.

In S617, the UE receives a new grant for gNB for the data. Then the flow goes to S618.

In S618, the UE transmits the data to gNB.

With the prediction BSR described above, embodiments of the present disclosure greatly extend pre-emptive BSR functionality to non-IAB scenarios. In the IAB scenario it can often be determined that there will be data at an UL node once the data has reached one of the down-stream nodes. In other scenarios, it is not so easy to determine that there will be UL data until it arrives in the UL UE buffer. However, in many cases it can be predicted that there will be data arriving and this can be exploited using a pre-emptive BSR.

According to embodiments of the present disclosure, in case prediction BSR is configured for a UE, on a high level, the algorithm could be:

1. A gNB configures the UE to apply prediction BSR.
   The configuration can include prediction algorithm, when/how often predictions are done (e.g. every slot), trigger thresholds (amount of predicted data, confidence levels), timer settings (prediction BSR-prohibit timer).
2. the UE initiates predictions of data amount in UL buffer.
   If the predicted buffer level exceeds a threshold, a prediction BSR is triggered.
   If UL resources to transmit prediction BSR are available
      transmit prediction BSR
      start prediction prohibit timer
   else
      transmit SR, and transmit prediction BSR in grant received as response to SR
3. When prediction BSR is transmitted, algorithm continues from (2). No new prediction BSRs can be transmitted until prediction prohibit timer expires (or prediction changes above a certain threshold).

According to embodiments of the present disclosure, SR-BSR-Data latency is reduced by triggering prediction BSR earlier than what a normal/regular BSR is triggered. Control of the amount or number of prediction BSRs sent may be also allowed.

Further, in the below embodiments, more details about mechanisms on how to design prediction BSR are described. These embodiments may be applicable to both IAB and non-IAB scenarios. The term pre-emptive BSR may also interchangeably called as prediction BSR or early BSR etc. Any similar term is equally applicable. An ordinary/regular BSR refers to a BSR carrying actual data buffer size of a LCH or LCG. It can be any of the below existing BSR MAC CE.

Short BSR (fixed size); or
Long BSR (variable size); or
Short Truncated BSR (fixed size);
Long Truncated BSR (variable size);

In the first embodiment, in case pre-emptive BSR is configured for a UE, a Pre-emptive BSR may be triggered if any of the following events occur:

it is predicted by the UE that there will be new data arriving at the UE, which will trigger a regular BSR after arriving;
it is determined by the UE that there will be new data arriving at the UE, which will trigger a regular BSR.

In the second embodiment, in case pre-emptive BSR is configured for a UE, there is a prediction function implemented at the UE for predicting whether and/or when there will be new data arrived at the UE, which will trigger a regular BSR after arriving. The prediction function may use input data from app behaviour, user behaviour (e.g. mobility), radio conditions, traffic behaviour (e.g., traffic pattern) etc., to be able to estimate the arrival of new data, with a probability X %.

Based on above embodiment, the prediction algorithm configured to the UE by the gNB, includes a condition when the algorithm shall be applicable. This can e.g. be when the UE goes from IDLE to ACTIVE, when the UE screen is unlocked. It should be understood that the UE may also make the prediction in IDLE state.

In the third embodiment, in case pre-emptive BSR is configured for a UE, a Pre-emptive BSR may be triggered if it is predicted by the UE that, at >=X % probability, there will be new data arriving at the UE which will trigger a regular BSR, wherein X is configured to the UE or hard coded in the any standards or technical specifications.

In the fourth embodiment, in case pre-emptive BSR is configured for a UE, a Pre-emptive BSR may be triggered if it is determined by the UE according to a corresponding traffic pattern that there will be new data arrived at the UE which will trigger a regular BSR.

In the fifth embodiment, for a UE MAC entity, if there is at least one pre-emptive BSR triggered and not cancelled,
  if UL-SCH resources are available for a new transmission and the UL-SCH resources can accommodate the Pre-emptive BSR MAC CE plus its subheader:
    instruct the Multiplexing and Assembly procedure to generate the Pre-emptive BSR MAC CE.
  else:
    trigger a Scheduling Request.

In the sixth embodiment, in case pre-emptive BSR is configured for a UE, the UE may be configured with a specific SR configuration, if there is at least one pre-emptive BSR triggered and not cancelled, while there are no any UL-SCH resource available for a new transmission which can accommodate the Pre-emptive BSR MAC CE plus its subheader, the UE MAC can trigger a scheduling request using this specific SR configuration.

In the seventh embodiment, a pre-emptive BSR can be configured per LCH or LCG (logic channel or logic channel group). In this case, prediction of new data can be performed per LCH or LCG. One LCH or LCG associated with a high priority index may be configured with pre-emptive BSR, while another LCH or LCG associated with a low priority index may be not configured with pre-emptive BSR. An LCH/LCG priority index threshold may be configured to the UE. In this case, an LCH/LCG associated with a priority index above the configured threshold can apply pre-emptive BSR, while an LCH/LCG associated with a priority index lower than the configured threshold will not apply pre-emptive BSR.

In the eighth embodiment, a pre-emptive BSR MAC CE and an ordinary BSR MAC CE (i.e., carries the actual buffer size of a LCH/LCG) may be included in a same MAC PDU.

In the ninth embodiment, the other ordinary BSR MAC CE is not allowed to be carried with a pre-emptive BSR in a same MAC PDU.

In the tenth embodiment, in a same BSR MAC CE, both a predicted or determined buffer size (BS) upon trigger of a pre-emptive BSR for an LCH or LCG and an actual BS upon trigger of an ordinary BSR for another LCG or LCG can be included together. In this case, a new BSR MAC CE format may be defined accordingly. The new format may include specific field/bit, or LCH ID values to indicated which one is a prediction, and which one is actual.

In the eleventh embodiment, a UE capability bit indicating whether the UE supports pre-emptive BSR is defined.

In the twelfth embodiment, whenever a UE has predicted with certain X % probability of data arrival of Y volume, regardless what value X and/or Y is, the UE is allowed to trigger a pre-emptive BSR. In this case, the UE can include information X or both X and Y to the gNB via a pre-emptive BSR MAC CE. Because the existing pre-emptive BSR MAC CE doesn't contain a prediction probability field, a new pre-emptive BSR MAC CE format may be defined accordingly. After receiving the BSR, the gNB may decide whether to allocate resources to the UE or not; and if allocated whether to allocate full resource to accommodate the UE's probable data or partial resource (e.g., X % of Y) as the prediction is not 100% from UE side. In this new pre-emptive BSR MAC CE format, a UE can include a time parameter for which it needs allocation for its transmission. The time can be specific time symbols/slots or a time-window in future. The time parameter can also have associated probability, which depicts the probability of data arrival in the buffer during that probable time instants.

In the thirteenth embodiment, for a UE, the gNB can configured the priority to the prediction of the data arrival in the BSR reporting. For e.g., the probability of data arrival between 0 to P % will be categorized low priority, the percentage between P % and Q % as moderate priority and between Q % and 100% as high priority, where 0<P<Q<100.

In the fourteenth embodiment, a pre-emptive BSR MAC CE carries estimated/predicted buffer size (BS) for LCHs/LCGs which are configured with pre-emptive BSR.

In the fifteenth embodiment, a pre-emptive BSR MAC CE carries estimated/predicted buffer size (BS) for LCHs which are configured with pre-emptive BSR and at least one BS for an LCH/LCG which are not configured with pre-emptive BSR (i.e., the actual BS of the available data).

In the sixteenth embodiment, a pre-emptive-prohibit timer is defined. This timer is started when a pre-emptive BSR MAC CE is transmitted. The timer is stopped if the UE receives a grant (in response to the pre-emptive BSR). While the timer is running, no new pre-emptive BSR MAC CE may be transmitted corresponding to the same LCH/LCG for which the original pre-emptive BSR was triggered. This timer is used to prevent the UL from being flooded by pre-emptive BSRs triggered by new predictions.

In another embodiment, the pre-emptive-prohibit timer is stopped if a new prediction indicates a large change compared to the last pre-emptive BSR. The change can be with respect to the predicted data size, the predicted time of the data arrival or the confidence with which the prediction is made (e.g., the prediction probability).

In another embodiment, a retransmission timer is used for the pre-emptive BSR. This is used to give updates of the predictions in a controlled manner In contrast to the pre-emptive BSR prohibit timer, a retransmission timer can update a previous prediction and report even if the new prediction does not fulfill the normal triggering threshold. In this way, it may indicate that the new prediction indicates less data or a less reliable prediction than what was previously reported.

In another embodiment, the prediction algorithm used by the UE may be configured. In some cases, this may be a UE specific algorithm, or it can be a specific publicly available algorithm. The available algorithms can be hard coded in the appropriate 3GPP specification.

In another embodiment, the UE reports the UE predication results to the gNB.

In the above embodiment, the UE includes a condition when this prediction occurs, e.g. the BSR probability X % of Y bytes after Z time when the UE state changes from IDLE to ACTIVE.

In the above embodiment, the gNB can use the said UE prediction report in above embodiment and configure another UE (in same cell) with these parameters.

In another embodiment, in order to distinguish a preemptive BSR MAC CE from an ordinary BSR MAC CE, a new logical channel ID (LCID) for identifying the preemptive BSR MAC CE is defined.

According to these detailed embodiments of the present disclosure, specific manners of how to apply the prediction BSR in different circumstances may be illustrated more clearly.

Figure 7:
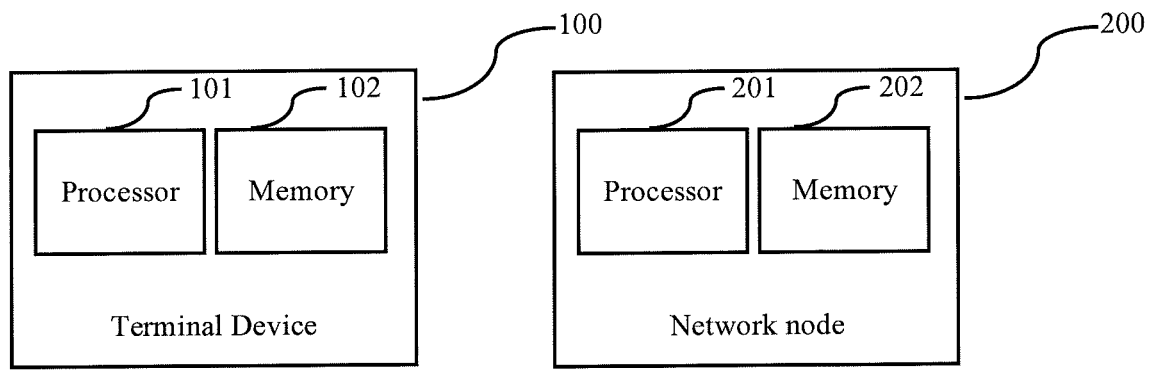
FIG. 7 is a block diagram showing exemplary apparatuses suitable for practicing the terminal device and the network node according to embodiments of the disclosure.

FIG. 7 is a block diagram showing exemplary apparatuses suitable for practicing the terminal device, and the network node according to embodiments of the disclosure.

As shown in FIG. 7, the terminal device 100 may comprise: a processor 101; and a memory 102. The memory 102 contains instructions executable by the processor 101, whereby the terminal device 100 is operative to: predict a buffer size associated with data to be transmitted; and transmit a buffer state report, BSR, including the predicted buffer size to a network node.

In embodiments of the present disclosure, the terminal device 100 is operative to perform the method according to any of the above embodiments, such as these shown in FIG. 4A-4B, 6.

As shown in FIG. 7, the network node 200 may comprise: a processor 201; and a memory 202. The memory 202 contains instructions executable by the processor 201, whereby the network node 200 is operative to: receive a buffer state report, BSR, including a predicted buffer size associated with data to be received from a terminal device; and transmit a grant for the data according to the received BSR.

In embodiments of the present disclosure, the terminal device 100 is operative to perform the method according to any of the above embodiments, such as these shown in FIG. 5A-6.

The processors 101, 201 may be any kind of processing component, such as one or more microprocessor or microcontrollers, as well as other digital hardware, which may include digital signal processors (DSPs), special-purpose digital logic, and the like. The memories 102, 202 may be any kind of storage component, such as read-only memory (ROM), random-access memory, cache memory, flash memory devices, optical storage devices, etc.

Figure 8:
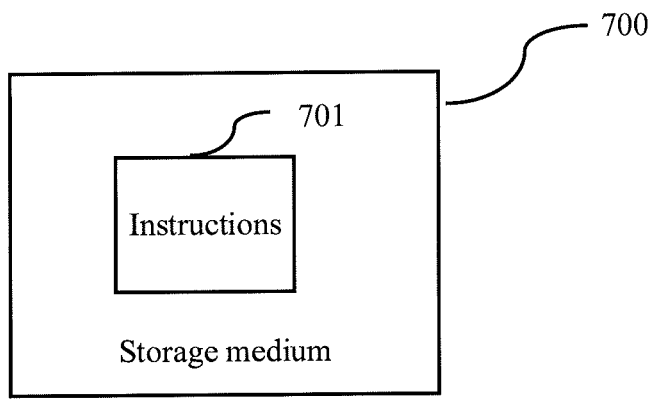
FIG. 8 is a block diagram showing an apparatus/computer readable storage medium, according to embodiments of the present disclosure.

FIG. 8 is a block diagram showing an apparatus/computer readable storage medium, according to embodiments of the present disclosure.

As shown in FIG. 8, the computer-readable storage medium 700, or any other kind of product, storing instructions 701 which when executed by at least one processor, cause the at least one processor to perform the method according to any one of the above embodiments, such as these shown in FIG. 4A-6.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 9:
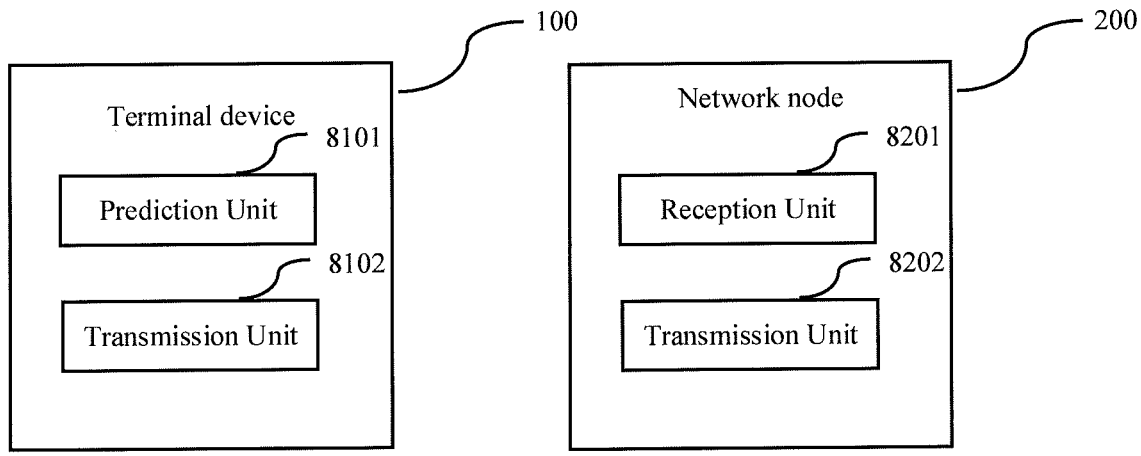
FIG. 9 is a schematic showing units for the terminal device and the network node, according to embodiments of the present disclosure.

FIG. 9 is a schematic showing units for terminal device and the network node, according to embodiments of the present disclosure.

As shown in FIG. 9, the terminal device 100 may comprise: a prediction unit 8101, configured to predict a buffer size associated with data to be transmitted; and a transmission unit 8102, configured to transmit a buffer state report, BSR, including the predicted buffer size to a network node.

In embodiments of the present disclosure, the terminal device 100 is operative to perform the method according to any of the above embodiments, such as these shown in FIG. 4A-4B, 6.

As shown in FIG. 9, the network node 200 may comprise: a reception unit 8201, configured to receive a buffer state report, BSR, including a predicted buffer size associated with data to be received from a terminal device; and a transmission unit 8202, configured to transmit a grant for the data according to the received BSR.

In embodiments of the present disclosure, the network node 200 is operative to perform the method according to any of the above embodiments, such as these shown in FIG. 5A-6.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 100 may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

Figure 10:
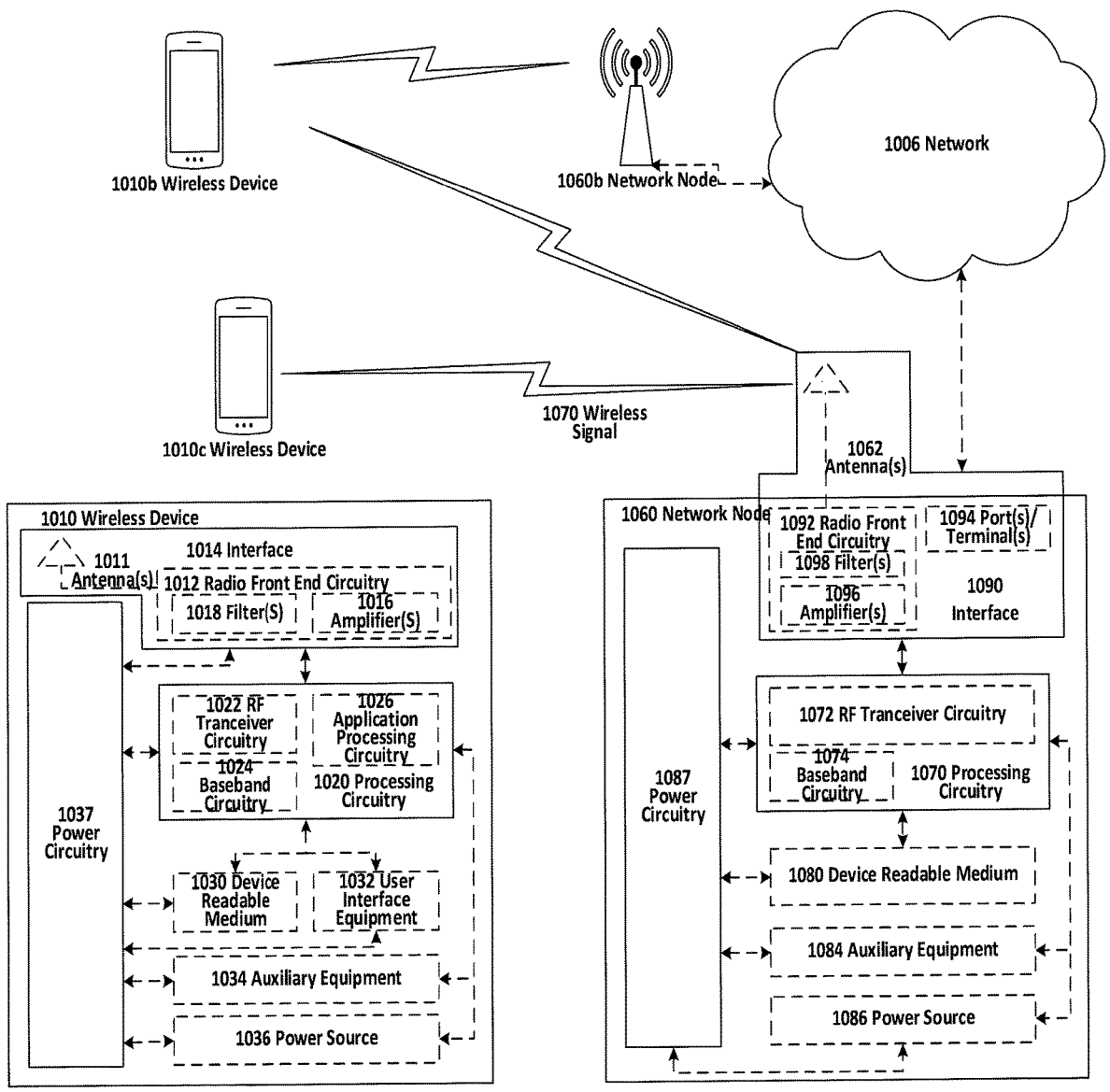
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 (corresponding to network node 200) and 1060b, and WDs 1010, 1010b, and 1010c (corresponding to terminal device 100). In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
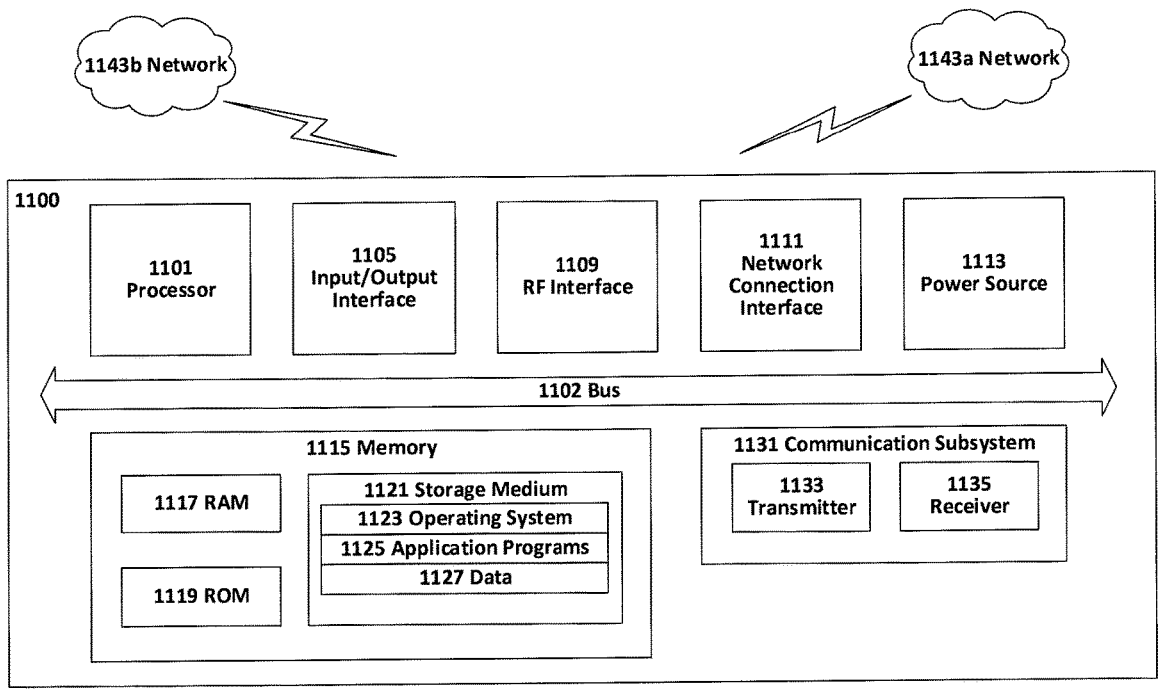
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
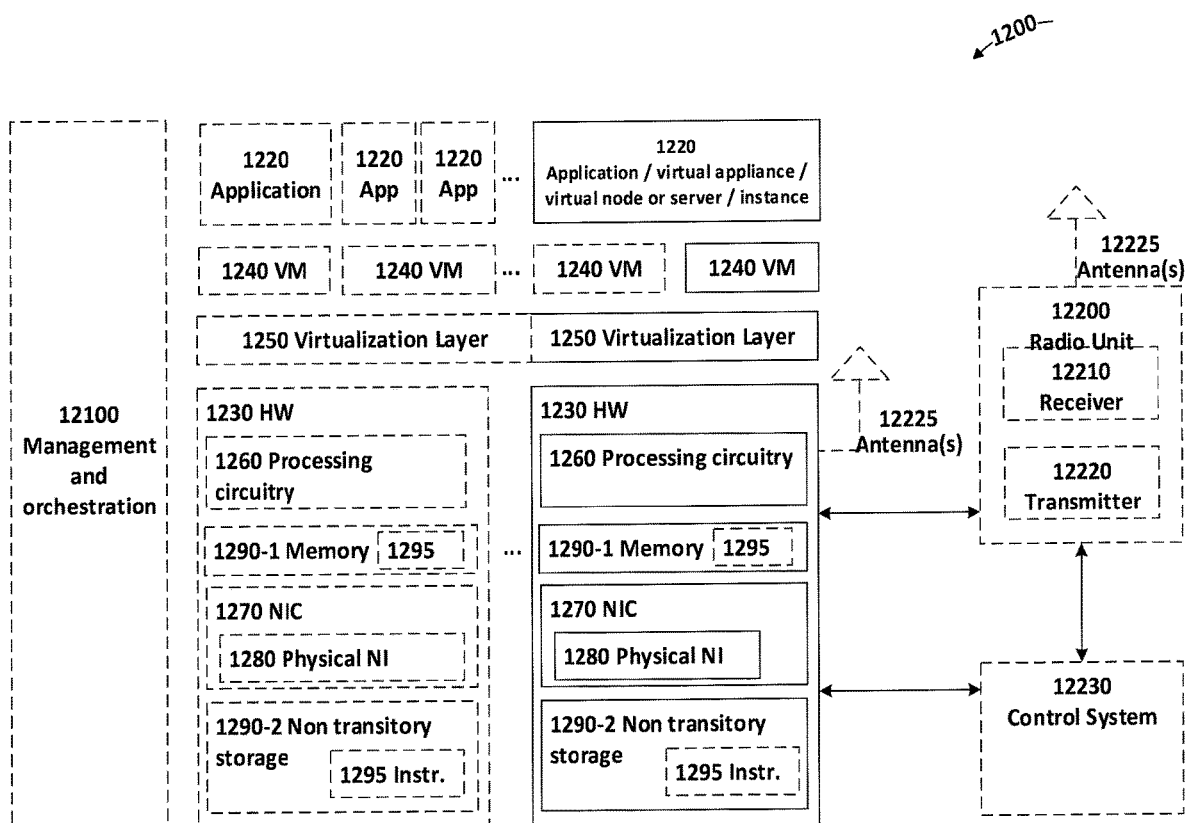
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
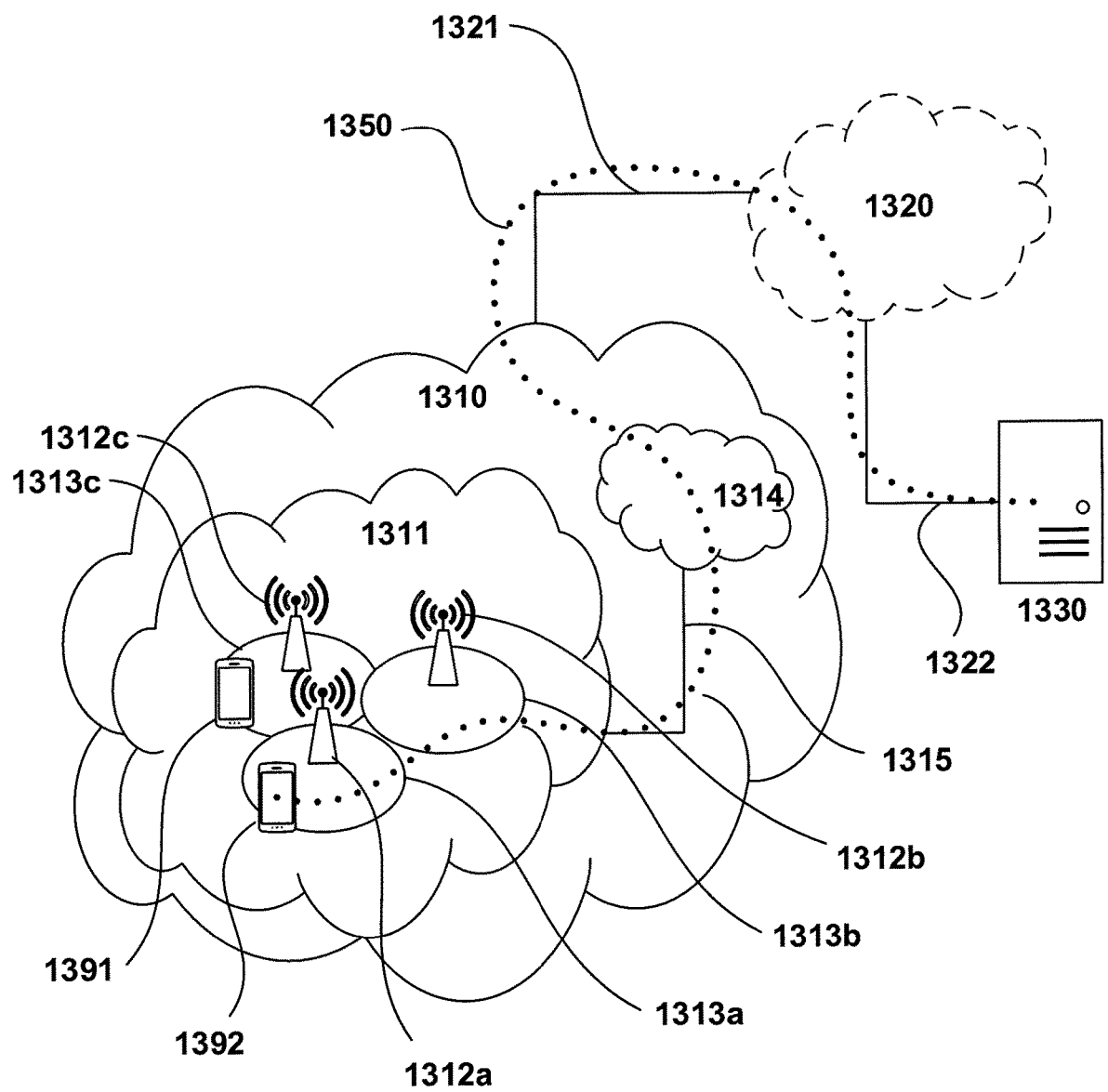
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
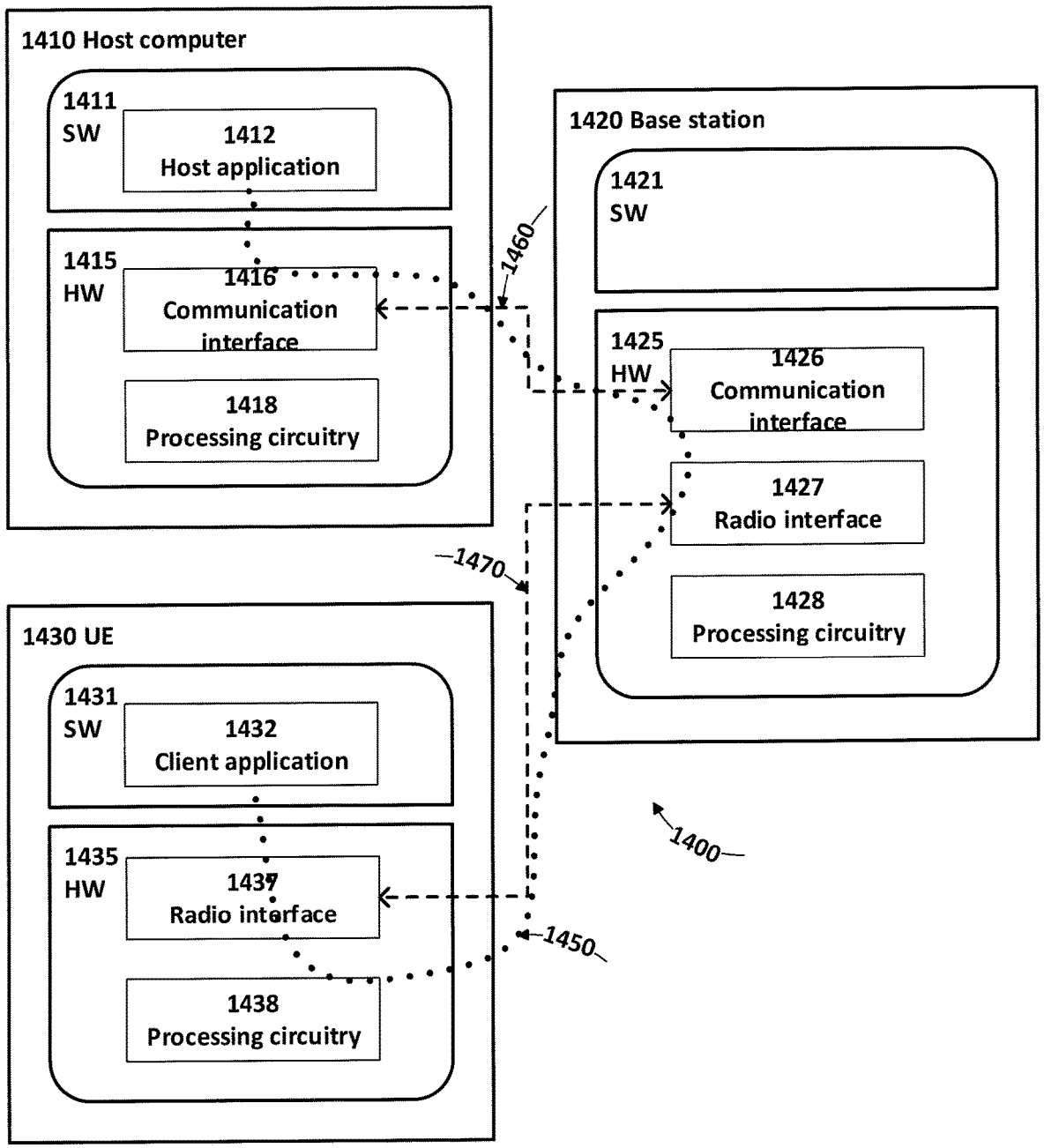
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
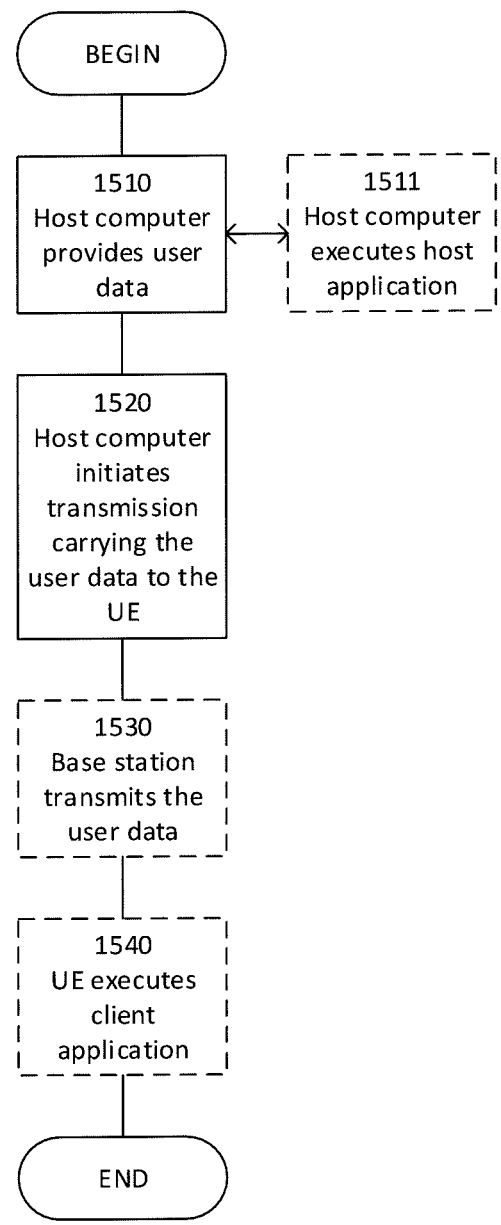
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
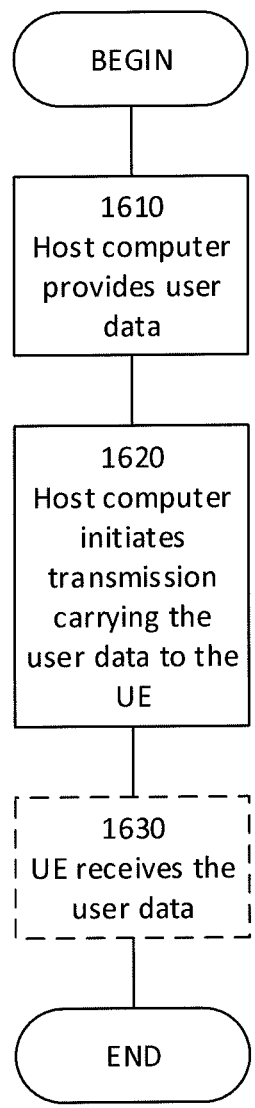
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
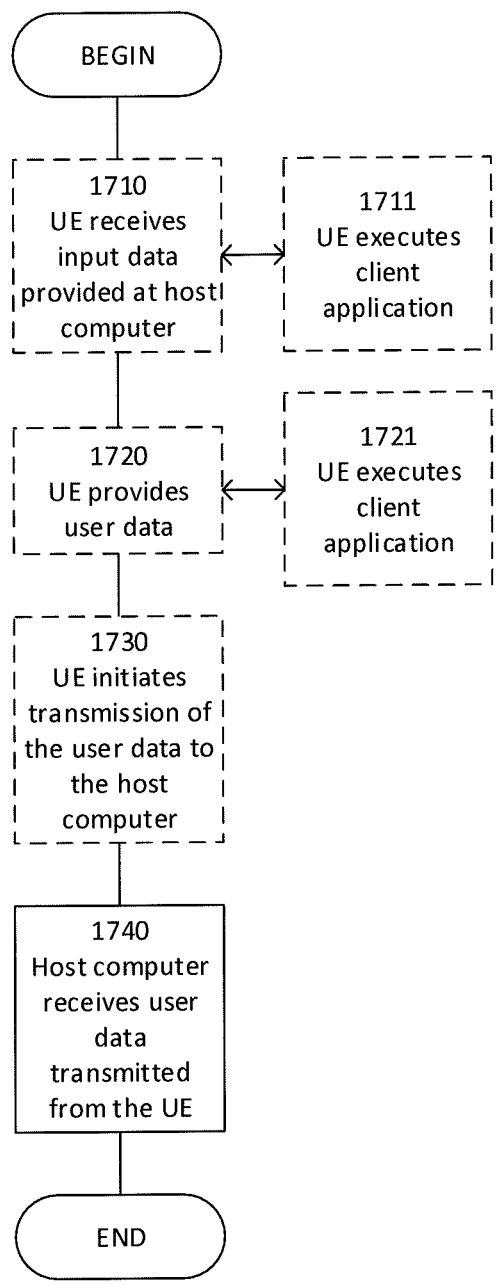
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
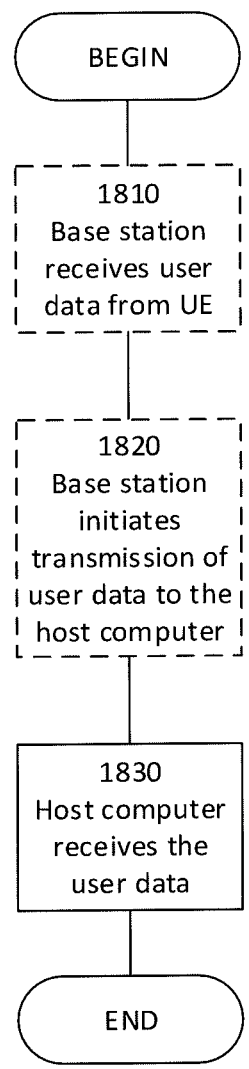
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method performed at a terminal device, comprising:
predicting a buffer size associated with data to be transmitted;
predicting a probability associated with the predicted buffer size;
transmitting a buffer state report, BSR, including the predicted buffer size to a network node;
receiving a grant for the data to be transmitted; and
transmitting the data.

2. The method according to claim 1, wherein the predicting is based on at least one of: a size, a type, a content, or a required transmission rate of the data;
input data from an application behaviour, a user behaviour, a radio condition, or a traffic behaviour.

3. The method according to claim 1, wherein the BSR includes the probability.

4. The method according to claim 3, wherein the terminal device transmits the BSR, when the probability is equal to or greater than a threshold.

5. The method according to claim 1, wherein the predicting is made by an artificial intelligence algorithm.

6. The method according to claim 1, further comprising:
receiving a BSR prediction configuration for the terminal device, or for a plurality of terminal devices.

7. The method according to claim 1, wherein the BSR is configured for a logic channel, or for a logic channel group; and
wherein the BSR is configured based on a priority of the logic channel or the logical channel group.

8. The method according to claim 1,
wherein the BSR further comprises a buffer size associated with data assigned to a logic channel.

9. The method according to claim 1, further comprising:
reporting a capability of the terminal device for supporting the BSR.

10. The method according to claim 1, wherein the BSR further comprises: a predicted time point or time window for transmitting the data.

11. The method according to claim 10, wherein the BSR further comprises: a probability of the predicted time point or time window for transmitting the data.

12. The method according to claim 1, wherein the predicted buffer size is included in a medium access control, MAC, control element, CE.

13. The method according to claim 1, further comprising:
receiving an indication for whether the BSR including the predicted buffer size is enabled or disabled.

14. The method according to claim 13, further comprising:
transmitting a buffer state report, BSR, including a buffer size associated with data assigned to a logical channel of the terminal device, when the BSR including the predicted buffer size is disabled.

15. The method according to claim 13,
wherein the indication comprises a threshold for a probability of the predicted buffer size.

16. The method according to claim 1, further comprising:
starting a timer after transmitting the BSR including the predicted buffer size; or
stopping the timer after receiving the grant.

17. The method according to claim 16, further comprising:
restarting the timer, if the predicted buffer size is updated and the BSR including the predicted buffer size is retransmitted
or
retransmitting the predicted BSR, when the timer expires.

18. A terminal device, comprising:
a processor; and
a memory, the memory containing instructions executable by the processor, whereby the terminal device is operative to:
predict a buffer size associated with data to be transmitted;
predict a probability associated with the predicted buffer size;

transmit a buffer state report, BSR, including the predicted buffer size to a network node;

receive a grant for the data to be transmitted; and transmit the data.

19. A network node, comprising:

a processor; and a memory, the memory containing instructions executable by the processor, whereby the network node is operative to:

receive a buffer state report, BSR, including a predicted buffer size associated with data to be received from a terminal device; wherein the BSR further includes a probability associated with the predicted buffer size predicted by the terminal device;

transmit a grant for the data according to the received BSR.

* * * * *